United States Patent [19]

Asghar et al.

[11] Patent Number: 5,136,537

[45] Date of Patent: Aug. 4, 1992

[54] METHOD AND APPARATUS FOR DETERMINING THE PRODUCT OF TWO NUMBERS

[75] Inventors: Safdar M. Asghar, Austin, Tex.; Donald D. Mondul, Naperville, Ill.

[73] Assignee: Advanced Micro Devices, Inc., Sunnyvale, Calif.

[21] Appl. No.: 794,995

[22] Filed: Nov. 19, 1991

[51] Int. Cl.$^5$ .............................................. G06F 7/52
[52] U.S. Cl. .................................................. 364/754
[58] Field of Search ............................... 364/754, 757

[56] References Cited

U.S. PATENT DOCUMENTS 4,573,136  2/1986  Rossiter ......................... 364/757 X
4,809,212  2/1989  New et al. ....................... 364/754 X

FOREIGN PATENT DOCUMENTS 57-69451    4/1982  Japan ................................. 364/754
58-101343   6/1983  Japan ................................. 364/754
59-35236    2/1984  Japan ................................. 364/754
59-58542    4/1984  Japan ................................. 364/754

OTHER PUBLICATIONS

Swithers et al., "Fast Multiply", IBM Tech. Discl. Bull. vol. 8 No. 11, Apr. 1966, p. 1492.
Larson, "Dual-Speed Multiply Unit", IBM Tech. Discl. Bull. vol. 16, No. 7 Dec. 1973, pp. 2199-2201.

*Primary Examiner*—Tan V. Mai
*Attorney, Agent, or Firm*—Foley & Lardner

[57] ABSTRACT

A method and apparatus for determining the product of a first number and a second number are disclosed. The preferred embodiment of the method includes the steps of: (1) determining a plurality of respective partial products for each pair-combination of the first number's digits and the second number's digits; (2) providing a register having a plurality of register cells, each having a hierarchical significance; (3) accumulating selected of the respective partial products to produce accumulated values in specified of the register cells according to the following relationships: $P_{m,n}$—[accumulates in]→$r_x$; $x=(m+n)-1$, where "$P_{m,n}$" represents the respective partial product; "m" represents the first number's significance (m=1, 2, ... ); "n" represents the second number's significance (n=1,2, ... ); and "$r_x$" represents a specified register cell having significance "x"; (4) sequentially effecting a shifting accumulation operation comprising shifting specific digits of the accumulated value stored in a lesser-significant register cell to the next-higher-significant register cell containing an accumulated value, and adding the specific digits to the accumulated value stored in the next-higher-significant register celll as least-significant digits between significance-adjacent register cells from the least-significant register cell to the most-significant register cell; and (5) shifting the contents of the register cells from the register cells.

13 Claims, 6 Drawing Sheets

| ≡m+n | $r_x$ | $r_1$ | $r_2$ | $r_3$ | $r_4$ | $r_5$ | $r_6$ | $r_7$ | $r_8$ | $r_9$ | $r_{10}$ | $r_{11}$ | $r_{12}$ | $r_{13}$ | $r_{14}$ | $r_{15}$ |
|---|---|---|---|---|---|---|---|---|---|---|---|---|---|---|---|---|
| 2 | 1,1 | | | | | | | | | | | | | | | |
| 3 | 2,1 | 1,2 | | | | | | | | | | | | | | |
| 4 | 3,1 | 2,2 | 1,3 | | | | | | | | | | | | | |
| 5 | 4,1 | 3,2 | 2,3 | 1,4 | | | | | | | | | | | | |
| 6 | 5,1 | 4,2 | 3,3 | 2,4 | 1,5 | | | | | | | | | | | |
| 7 | 6,1 | 5,2 | 4,3 | 3,4 | 2,5 | 1,6 | | | | | | | | | | |
| 8 | 7,1 | 6,2 | 5,3 | 4,4 | 3,5 | 2,6 | 1,7 | | | | | | | | | |
| 9 | 8,1 | 7,2 | 6,3 | 5,4 | 4,5 | 3,6 | 2,7 | 1,8 | | | | | | | | |
| 10 | 9,1 | 8,2 | 7,3 | 6,4 | 5,5 | 4,6 | 3,7 | 2,8 | 1,9 | | | | | | | |
| 11 | 10,1 | 9,2 | 8,3 | 7,4 | 6,5 | 5,6 | 4,7 | 3,8 | 2,9 | 1,10 | | | | | | |
| 12 | 11,1 | 10,2 | 9,3 | 8,4 | 7,5 | 6,6 | 5,7 | 4,8 | 3,9 | 2,10 | 1,11 | | | | | |
| 13 | 12,1 | 11,2 | 10,3 | 9,4 | 8,5 | 7,6 | 6,7 | 5,8 | 4,9 | 3,10 | 2,11 | 1,12 | | | | |
| 14 | 13,1 | 12,2 | 11,3 | 10,4 | 9,5 | 8,6 | 7,7 | 6,8 | 5,9 | 4,10 | 3,11 | 2,12 | 1,13 | | | |
| 15 | 14,1 | 13,2 | 12,3 | 11,4 | 10,5 | 9,6 | 8,7 | 7,8 | 6,9 | 5,10 | 4,11 | 3,12 | 2,13 | 1,14 | | |
| 16 | 15,1 | 14,2 | 13,3 | 12,4 | 11,5 | 10,6 | 9,7 | 8,8 | 7,9 | 6,10 | 5,11 | 4,12 | 3,13 | 2,14 | | |

COL., ROW (m,n)

METHOD AND APPARATUS FOR DETERMINING THE PRODUCT OF TWO NUMBERS

BACKGROUND OF THE INVENTION

The present invention is directed to a method for determining the product of two numbers and an apparatus for carrying out that method.

In a computing system employing solid state components, preferably constructed from silicon components arrayed on a substrate, certain basic design criteria generally apply. For example, it is desired that the least space possible upon the substrate be occupied by each component. Further, it is desired that energy consumed by the apparatus be minimized as much as possible, especially in battery-supplied systems. Also, it is desired that the computing system operate as speedily as possible.

A multiplier for such computing systems is generally fashioned of a matrix of switching transistors, which matrix is of sufficient size to accommodate the maximum expected size of numbers to be handled by the computing apparatus. Thus, for example, in order to have a multiplication of a 4-digit number by a 4-digit number, a multiplier would necessarily comprise a 16×16 bit matrix (i.e., 16 columns of transistors, each column having 16 rows of transistors) with additional rows, or columns, or both to accommodate carries and other overhead operations involved in multiplication.

For smaller numbers, higher significance bits within the multiplier matrix are zero-filled as appropriate to correctly store the multiplicand and the multiplier involved in the multiplication operation. However, those zero-filled bits must still be powered-up in order to effect such zero-filling. Such zero-filled bits are necessarily involved in the calculations effected by the multiplier, so speed of operation, power requirements, and "real estate" (i.e., space) occupancy on the substrate are all sacrificed in accommodating larger numbers for multiplication operations.

It would be advantageous to have a multiplier which only powers-up a sufficient number of bits necessary for a specific multiplication operation to conserve power, especially in a battery-supplied system. It would be further advantageous to have a multiplier which occupies as little "real estate" as possible on the substrate in order to conserve space and enhance packaging of a system employing the multiplier. It would be still further advantageous to have a multiplier which speedily effects multiplication operations to enhance the operational speed of a system employing the multiplier.

It would also be advantageous to effect multiplication by a method which facilitates design and operation of a multiplier which can realize the above-described desired advantages.

SUMMARY OF THE INVENTION

The present invention includes a method for determining the product of a first number and a second number, which first number has a plurality of first digits hierarchically arranged from a first least-significant place to a first most-significant place, and which second number has a plurality of second digits hierarchically arranged from a second least-significant place to a second most-significant place. The method comprises, in its preferred embodiment, the steps of:

(1) determining a plurality of partial products (treating blank places of the shorter number as zeroes); the plurality of partial products comprising respective partial products for each pair-combination of the first digits and second digits of the respective numbers, thereby establishing a combinational significance determined by the significance of the first digit and the significance of the second digit of the pair-combination involved in each respective partial product;

(2) providing a register having a plurality of register cells for storing accumulated values, which register cells have hierarchical significance;

(3) accumulating selected of the respective partial products to produce accumulated values in specified of the register cells according to the following relationships:

$$P_{m,n} \text{—[accumulates in]} \rightarrow r_x; \; x = (m+n) - 1$$

where "$P_{m,n}$" represents the respective partial product; "m" represents the first significance (m=1, 2, ...); "n" represents the second significance (n=1, 2, ...); and "$r_x$" represents a specified register cell having significance "x";

(4) effecting a shifting accumulation operation comprising shifting specific digits of the accumulated value stored in a lesser-significant register cell to the next-higher-significant register cell containing an accumulated value, and adding the specific digits to the accumulated value stored in the next-higher-significant register cell as least-significant digits; the specific digits being those digits of the accumulated value stored in the lesser-significant register cell having higher significance than the least-significant digit of the accumulated value; the shifting accumulation operation being effected sequentially between significance-adjacent register cells from the least-significant register cell to the most-significant register cell within the register; and (5) reading the contents of the plurality of register cells to ascertain the product.

A further aspect of the present invention includes an apparatus for practicing the above-described method, which apparatus, in its preferred embodiment, comprises a logic circuit for determining the respective partial products for each pair-combination of the plurality of first digits and the plurality of second digits; a register having a plurality of register cells for storing accumulated values, which register cells have a hierarchical significance; and an accumulating circuit for accumulating selected of the respective partial products to produce accumulated values, the accumulating circuit storing the accumulated values in specified register cells according to the relationships expressed above.

It is, therefore, an object of the present invention to provide a method and apparatus for determining the product of two numbers which facilitate powering-up only sufficient components necessary for a specific multiplication operation to conserve power consumption.

It is a further object of the present invention to provide a method and apparatus for determining the product of two numbers which efficiently occupies space on a substrate in a system employing the apparatus.

Yet a further object of the present invention is to provide a method and apparatus for determining the product of two numbers which speedily effects multiplication operations to enhance the operational speed of a system employing the apparatus.

Further objects and features of the present invention will be apparent from the following specification and claims when considered in connection with the accompanying drawings illustrating the preferred embodiment of the invention.

BRIEF DESCRIPTION OF THE DRAWINGS

FIG. 2 is a table illustrating the assignment of accumulated values to respective register cells according to the method of the present invention.

DETAILED DESCRIPTION OF THE INVENTION

Figure 1:
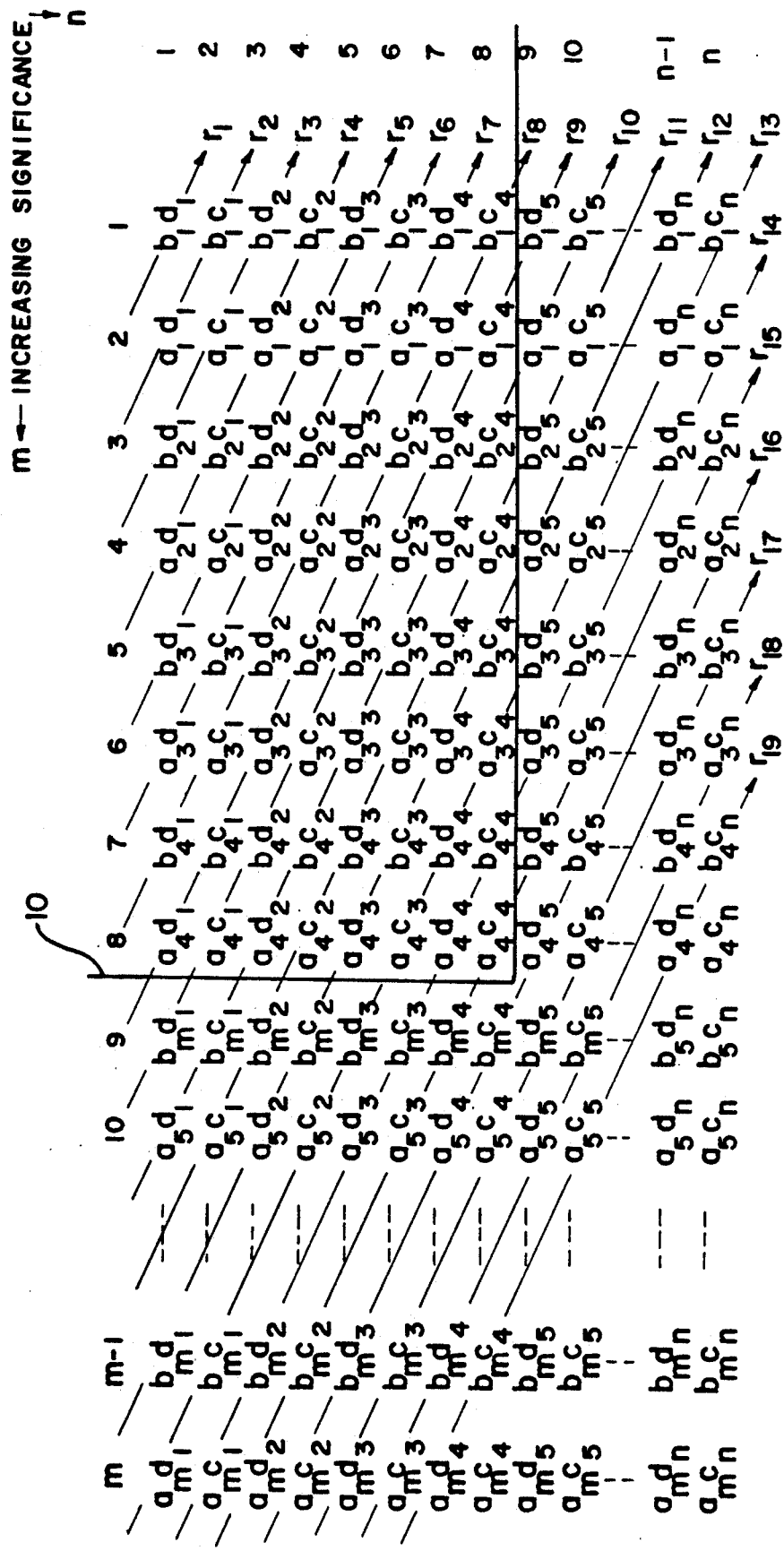
FIG. 1 is a representation of a generalized matrix for determining register set-ups according to the first embodiment of the method of the present invention.

Traditional high speed data signal processing apparatuses employ high speed multipliers to execute algorithms for purposes of such functions as speech compression, operation of high speed modems, operation of digital filters, and the like. Typically, the multipliers employed for such functions are large (on the order of a 16×16 bit array) and involve high power consumption, large die area ("real estate" occupancy on the substrate), and high precision. Other uses of multipliers, such as arithmetic logic units, generally suffer from the same disadvantages—high power consumption and large die area—in order to maintain high speed operation, and the disadvantages are exacerbated with requirements for higher speed, higher precision, and larger numbers.

The present invention includes a method for determining the product of two numbers (i.e., a method for multiplication) which comprises a distribution of multiplying operations among a plurality of smaller multipliers than the size of multiplier which would be required for multiplying with a single multiplier. Such distributive processing maintains speed of operation and precision of results while providing for a lesser die area requirement and affording the opportunity to only power-up the particular multiplying units in the distributive processing arrangement required for the particular multiplicand and multiplier involved in a specific multiplication operation.

Generally, the method involves the generation of partial products of portions of the multiplicand and multiplier, which partial products each individually require a smaller multiplier unit, and effecting a shifting accumulation operation in a register in which the partial products have been accumulated according to particular respective significances of the digits of the multiplicand and the digits of the multiplier.

In order to facilitate understanding of the terms used in describing the method of the present invention, the following terms are illustrated.

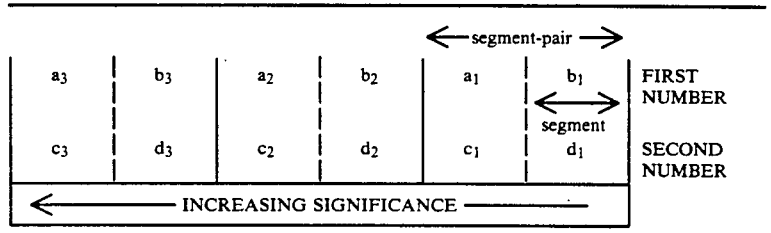

| | | | | | | |
|---|---|---|---|---|---|---|
| $a_3$ | $b_3$ | $a_2$ | $b_2$ | $a_1$ | $b_1$ | FIRST NUMBER |
| $c_3$ | $d_3$ | $c_2$ | $d_2$ | $c_1$ | $d_1$ | SECOND NUMBER |

←———— INCREASING SIGNIFICANCE ————

| FIRST ADDITIVE COMPRESSIONS | FIRST SUBTRACTIVE COMPRESSIONS | SECOND ADDITIVE COMPRESSIONS | SECOND SUBTRACTIVE COMPRESSIONS |
|---|---|---|---|
| $(a_1 + b_1)$ | $(a_1 - b_1)$ | $(c_1 + d_1)$ | $(c_1 - d_1)$ |
| $(a_2 + b_2)$ | $(a_2 - b_2)$ | $(c_2 + d_2)$ | $(c_2 - d_2)$ |
| $(a_3 + b_3)$ | $(a_3 - b_3)$ | $(c_3 + d_3)$ | $(c_3 - d_3)$ |
| . | . | . | . |
| . | . | . | . |
| . | . | . | . |
| $(a_m + b_m)$ | $(a_m - b_m)$ | $(c_n + d_n)$ | $(c_n - d_n)$ |

Primary Partial Products: $P1_{m,n}$
$b_1d_1\ b_2d_1 \ldots b_md_1$
$b_1d_2\ b_2d_2 \ldots b_md_2$
$b_1d_3\ b_2d_3 \ldots b_md_3$
. .    .
. .    .
. .    .
$b_1d_n\ b_2d_n \ldots b_md_n$ Secondary Partial Products: $P2_{m,n}$
$(a_1 + b_1)(c_1 + d_1)\ (a_2 + b_2)(c_1 + d_1) \ldots (a_m + b_m)(c_1 + d_1)$
$(a_1 + b_1)(c_2 + d_2)\ (a_2 + b_2)(c_2 + d_2) \ldots (a_m + b_m)(c_2 + d_2)$ -continued $(a_1 + b_1)(c_3 + d_3) (a_2 + b_2)(c_3 + d_3) \ldots (a_m + b_m)(c_3 + d_3)$ $\cdot$
$\cdot$
$\cdot$ $(a_1 + b_1)(c_n + d_n) (a_2 + b_2)(c_n + d_n) \ldots (a_m + b_m)(c_n + d_n)$ Tertiary Partial Products: $P3_{m,n}$
$(a_1 - b_1)(c_1 - d_1) (a_2 - b_2)(c_1 - d_1) \ldots (a_m - b_m)(c_1 - d_1)$
$(a_1 - b_1)(c_2 - d_2) (a_2 - b_2)(c_2 - d_2) \ldots (a_m - b_m)(c_2 - d_2)$
$(a_1 - b_1)(c_3 - d_3) (a_2 - b_2)(c_3 - d_3) \ldots (a_m - b_m)(c_3 - d_3)$ $\cdot$
$\cdot$
$\cdot$ $(a_1 - b_1)(c_n - d_n) (a_2 - b_2)(c_n - d_n) \ldots (a_m - b_m)(c_n - d_n)$ Additive Factor: $F_{m,n}{}^+$
$F_{m,n}{}^+ = [(P2_{m,n} + P3_{m,n}) \div 2] - P1_{m,n}$ Subtractive Factor: $F_{m,n}{}^-$
$F_{m,n}{}^- = (P2_{m,n} - P3_{m,n}) \div 2$ According to a first embodiment of the method of the present invention, a first number and a second number are multiplied. The first number has a plurality of first digits hierarchically arranged from a least-significant place to a most-significant place. and the second number has a plurality of second digits hierarchically arranged from a least-significant place to a most-significant place. The most-significant places of the shorter of the two numbers are zero-filled appropriately that the first and second numbers occupy a like number of places. The first number is segmented into at least one first segment-pair, each of which first segment-pairs being representable by an expression "$a_m,b_m$", where "a" represents a higher-significance first segment of a respective first segment-pair and "b" represents a lower-significance first segment of the respective first segment-pair ("m"=1, 2, 3, ... ). "m" represents the significance of the respective first segment-pair within the first number. The second number is similarly segmented into at least one second segment-pair, each of which second segment-pairs being representable by an expression "$c_n,d_n$", where "c" represents a higher-significance second segment of a respective second segment-pair and "d" represents a lower-significance second segment of a respective second segment-pair ("n"=1, 2, 3, ... ). "n" represents the significance of the respective second segment-pair within the second number. Thus, the two numbers are segmented into an equal number of segment-pairs, and each of the first segments and second segments, for a given span of significance, comprise an equal number of digits.

An additive compression is calculated for each of the first segment-pairs and each of the second segment-pairs. That is, a first additive compression for each of the first segment-pairs, representable by an expression "$(a_m+b_m)$", and a second additive compression for each of the second segment-pairs, representable by an expression "$(c_n+d_n)$", are calculated. Similarly, a first subtractive compression for each of the first segment-pairs, representable by an expression "$(a_m-b_m)$", and a second subtractive compression for each of the second segment-pairs, representable by an expression "$(c_n-d_n)$", are also calculated.

A set of primary partial products, comprising the products of each lesser-significance segment of each of the first segment-pairs with each lesser-significance segment of each of the second segment-pairs, is calculated. Each primary partial product is representable by an expression "$P1_{m,n}$", where $P1_{m,n}=b_m d_n$, and "m,n" establishes a combinational significance for each of the primary partial products.

A set of secondary partial products, comprising the products of each of the first additive compressions with each of the second additive compressions, is calculated. Each of the secondary partial products is representable by an expression "$P2_{m,n}$" where $P2_{m,n}=(a_m+b_m)(c_n+d_n)$, and "m,n" establishes a combinational significance for each of the secondary partial products.

A set of tertiary partial products, comprising the products of each of the first subtractive compressions with each of the second subtractive compressions, is calculated. Each of the tertiary partial products is representable by an expression "$P3_{m,n}$", where $P3_{m,n}=(a_m-b_m)(c_n-d_n)$, and "m,n" establishes a combinational significance for each of the tertiary partial products.

The sum of a specific secondary partial product with a specific tertiary partial product having the same combinational significance, is calculated. The sum thus calculated is divided by two to provide an interim result. The primary partial product having the same combinational significance as the combinational significances of the secondary and tertiary partial products used in calculating the interim result is subtracted from that interim result to produce an additive factor. Each addition factor is representable by an expression "$F_{m,n}{}^+$", where $F_{m,n}{}^+ = [(P2_{m,n}+P3_{m,n})\div 2]-P1_{m,n}$.

The difference of a secondary partial product less a tertiary partial product having the same combinational significance, is calculated to yield an interim difference. The interim difference is divided by two to produce a subtractive factor. Each subtractive factor is representable by an expression "$F_{m,n}{}^-$", where $F_{m,n}{}^- = (P2_{m,n}-P3_{m,n})\div 2$.

The primary partial products, the subtractive factors, and the additive factors are accumulated in a register having an array of register cells to yield an accumulated value in appropriate of the register cells. The register cells are arrayed hierarchically from a first register cell to a ($4j-1$) register cell, where "j" represents the number of first segment-pairs. The first register cell has the lowest significance in the hierarchical arrangement, and each of the plurality of register cells is representable by $r_x$, where "x" indicates the significance of a respective register cell. The accumulation of the plurality of primary partial products in a respective register cell is effected according to the relationship:

$$P1_{m,n} = b_m d_n - [\text{accumulates in}] \rightarrow r_{2(m+n)-3}.$$

The accumulation of subtractive factors in a respective register cell is effected according to the relationship:

$$F_{m,n}^- - [\text{accumulates in}] \rightarrow r_{2(m+n)-2}.$$

The accumulation of the additive factors in a respective register cell is effected according to the relationship:

$$F_{m,n}^+ - [\text{accumulates in}] \rightarrow r_{2(m+n)-1}.$$

There is then effected a shifting accumulation operation from a lesser-significant register cell within the array of register cells to a next-higher-significance cell within the array of register cells. The shifting accumulation operation begins with the least-significant register cell and comprises shifting specific digits in the accumulated value in the lesser-significance register cell to the next-higher-significance register cell and summing the shifted digits of the higher significance as least-significant digits with the accumulated value in the next-higher-significance register cell. The specific digits to be shifted comprise all digits having higher significance than the number of least-significant digits in the accumulated value in the lesser-significance register cell equal to the number of digits in each of the first segments into which the first number is divided. The shifting accumulation operation continues from the least-significant cell and is effected sequentially between significance-adjacent register cells until the next-higher-significance register cell is the $(4j-1)$ cell, that is, the highest-significance cell having an accumulated value stored therein. The number which is stored within the array of register cells after completion of the shifting accumulation operation described above comprises the product of the first number and second number, and may be shifted out of the array of register cells for use in further processing as appropriate in the apparatus employing the method of the present invention.

The method of the present invention may be illustrated by example:

EXAMPLE I

To multiply 256×256:
(1) Segregate the multiplicand and the multiplier into segment-pairs as follows:

```
    25 | 6
    25 | 6
   ─────────
   65, 5 | 36
```

Let $a = 25 \quad c = 25$
$\quad\quad b = 6 \quad\quad d = 6$ (2) Determine additive compressions and subtractive compressions as follows:

$(a + b) = 31 \quad (a - b) = 19$
$(c + d) = 31 \quad (c - d) = 19$ (3) Determine a primary partial product (P1) as follows:

$bd = 36$ (4) Determine an additive factor ($F^+$) and a subtractive factor ($F^-$) as follows:

$(a + b)(c + d) = 31 \times 31 = 961$ [Secondary Partial Product]
$(a - b)(c - d) = 19 \times 19 = 361$ [Tertiary Partial Product]

$(a + b)(c + d) = ac + bc + ad + bd = 961 = P2$
$(a - b)(c - d) = ac - bc - ad + bd = 361 = P3$ $P2 + P3 = [(a + b)(c + d)] + [(a - b)(c - d)]$ $\begin{aligned} P2 + P3 = 2ac + 2bd &= 1322 \\ ac + bd &= 661 \\ ac &= 661 - bd \\ ac &= 661 - 36 = 625 = F^+ \end{aligned}$ $P2 - P3 = [(a + b)(c + d)] - [(a - b)(c - d)]$ $\begin{aligned} P2 - P3 = 2bc + 2ad &= 600 \\ bc + ad &= 300 = F^- \end{aligned}$ (5) Accumulation of the determined terms in a plurality of register cells, hierarchically arranged according to significance, is determined as follows:
(a) Generally, according to generally accepted methods of manual multiplication:

```
        a   b
      × c   d
      ───────
         ad  bd
      ac  bc
     ─────────────────
     [ac] + [ad + bc] + [bd]
```

(b) Thus, the array of register cells is set up for accumulating values as follows:

```
    r3  |  r2      | r1
   ─────────────────────
    ac  | ad + bc  | bd
```

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

```
    ac  | ad + bc | bd
   ─────────────────────
   625  |   300   | 36
    30  |     3   |
   ─────────────────────
   655  |   303   |

655       3       6
```

(7) The contents of the register contain the correct answer (65,536), and are available for further processing by shifting the contents from the array of register cells, either serially or in parallel, as appropriate.

The method gives correct results regardless of how the multiplicand and multiplier are segregated, so long as "a" and "c" have an equal number of digits (blanks are treated as zeroes), and so long as "b" and "d" have an equal number of digits:

EXAMPLE II (1) Segregate the multiplicand and the multiplier as follows:

$$\begin{array}{r} 1000\,|0 \\ \times\ 2\,|5 \end{array}$$

Let $a = 1000$, $c = 2$
$b = 0$, $d = 5$ (2) Determine additive compressions and subtractive compressions as follows:

$(a + b) = 1000$  $(a - b) = 1000$
$(c + d) = 7$  $(c - d) = -3$ (3) Determine a primary partial product (P1) as follows:

$bd = 0$ (4) Determine an additive factor (F+) and a subtractive factor (F−) as follows:

(F−) as follows:
$(a + b)(c + d) = ac + bc + ad + bd = 7000 = P2$
$(a - b)(c - d) = ac - bc - ad + bd = -3000 = P3$ $P2 + P3 = [(a + b)(c + d)] + [(a - b)(c - d)]$ $P2 + P3 = 2ac + 2bd = 4000$
$ac + bd = 2000$
$ac = 2000 - bd$
$ac = 2000 - 0 = 2000 = F^+$ $P2 - P3 = [(a + b)(c + d)] - [(a - b)(c - d)]$ $P2 - P3 = 2bc + 2ad = 10000$
$bc + ad = 5000 = F^-$ (5) Accumulation of the determined terms in a plurality of register cells, hierarchically arranged according to significance, is determined as follows:
(a) Generally, according to generally accepted methods of manual multiplication:

$$\begin{array}{r} a\quad b \\ \times\ c\quad d \\ \hline ad\quad bd \\ ac\quad bc \\ \hline [ac]+[ad+bc]+[bd] \end{array}$$

(b) Thus, the array of register cells is set up for accumulating values as follows:

| r3 | r2 | r1 |
|---|---|---|
| ac | ad+bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc+ad | bd |
|---|---|---|
| 2000 | 5000 | 0 |
| 500 | | |
| 2500 | 0 | 0 |
| 2500 | 0 | 0 |

(7) The contents of the register contain the correct answer (250,000), and are available for further processing by shifting the contents from the array of register cells, either serially or in parallel, as appropriate.

The method accommodates larger numbers as well:

EXAMPLE III

To multiply $1{,}234 \times 5{,}678$:

(1) Segregate the multiplicand and the multiplier as follows:

$$\begin{array}{r} 1{,}234 \\ \times\ 5{,}678 \\ \hline 9{,}872 \\ 8{,}638 \\ 7{,}404 \\ 6{,}170 \\ \hline 7{,}006{,}652 \end{array}$$

Let $a = 12$, $c = 56$
$b = 34$, $d = 78$ (2) Determine additive compressions and subtractive compressions as follows:

$(a+b) = 46$  $(a-b) = -22$
$(c+d) = 134$  $(c-d) = -22$ (3) Determine a primary partial product (P1) as follows:

$bd = 2652$ (4) Determine an additive factor (F+) and a subtractive factor (F−) as follows:

$(a+b)(c+d) = ac+bc+ad+bd = 6164 = P2$
$(a-b)(c-d) = ac-bc-ad+bd = 484 = P3$ $P2+P3 = [(a+b)(c+d)] + [(a-b)(c-d)]$ $P2+P3 = 2ac+2bd = 6648$
$ac+bd = 3324$
$ac = 3324-bd$
$ac = 3324-2652 = 672 = F^+$ $P2-P3 = [(a+b)(c+d)] - [(a-b)(c-d)]$ $P2-P3 = 2bc+2ad = 5680$
$bc+ad = 2840 = F$ (5) Accumulation of the determined terms in a plurality of register cells, hierarchically arranged according to significance, is determined as follows:
(a) Generally, according to generally accepted methods of manual multiplication:

$$\begin{array}{r} a\quad b \\ \times\ c\quad d \\ \hline ad\quad bd \\ ac\quad bc \\ \hline [ac]+[ad+bc]+[bd] \end{array}$$

(b) Thus, the array of register cells is set up for accumulating values as follows:

| $r_3$ | $r_2$ | $r_1$ |
|---|---|---|
| ac | ad+bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc + ad | bd |
|---|---|---|
| 672 | 2840 | 2652 |
| 28 | 26 | |
| 700 | 2866 | |
| 700 | 66 | 52 |

(7) The contents of the register contain the correct answer (7,006,652), and are available for further processing by shifting the contents from the array of register cells, either serially or in parallel, as appropriate.

The method operates for numbers other than base 10 numbers. For example, to multiply 135×214 (Base 7 Numbers):

EXAMPLE IV (Base 7 Numbers)

(1) Segregate the multiplicand and the multiplier as follows:

$7^2 7^1 7^0$   Let $a = 13$   $c = 21$
           $b = 5$    $d = 4$

```
1 3 5
2 1 4
─────
6 0 6
1 3 5
3 0 3
─────
3 2 5 5 6
```

(2) Determine additive compressions and subtractive compressions as follows:

$(a + b) = 21$    $(a - b) = 5$
$(c + d) = 25$    $(c - d) = 14$ (3) Determine a primary partial product (P1) as follows:

$bd = 26$ (4) Determine an additive factor (F$^+$) and a subtractive factor (F$^-$) as follows:

$(a + b)(c + d) = ac + bc + ad + bd = 555 = P2$
$(a - b)(c - d) = ac - bc - ad + bd = 106 = P3$ $P2 + P3 = [(a + b)(c + d)] + [(a - b)(c - d)]$
$P2 + P3 = 2ac + 2bd = 664$
$\quad ac + bd = 332$
$\quad\quad ac = 332 - bd$
$\quad\quad ac = 332 - 26 = 303 = F^+$
$P2 - P3 = [(a + b)(c + d)] - [(a - b)(c - d)]$
$P2 - P3 = 2bc + 2ad = 446$ -continued
$bc + ad = 223 = F^-$ (5) Accumulation of the determined terms in a plurality of register cells, hierarchically arranged according to significance, is determined as follows:

(a) Generally, according to generally accepted methods of manual multiplication:

```
    a  b
 ×  c  d
 ─────
   ad bd
 ac bc
```
$[ac] + [ad + bc] + [bd]$ (b) Thus, the array of register cells is set up for accumulating values as follows:

| $r_3$ | $r_2$ | $r_1$ |
|---|---|---|
| ac | ad + bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc+ad | bd |
|---|---|---|
| 303 | 223 | 26 |
| 22 | 2 | |
| 325 | 225 | |
| 325 | 5 | 6 |

(7) The contents of the register contain the correct answer (32,556), and are available for further processing by shifting the contents from the array of register cells, either serially or in parallel, as appropriate.

The method can be extended to more fully segregate the multiplicand and the multiplier to further distribute the multiplication operation and thereby employ even smaller multipliers in distributive processing:

EXAMPLE V (1) Segregate the multiplicand and the multiplier as follows:

```
   1,234      Let a₁ = 3     a₂ = 1
 × 5,678          b₁ = 4     b₂ = 2
 ───────          c₁ = 7     c₂ = 5
   9,872          d₁ = 8     d₂ = 6
   8,638
   7,404
   6,170
 ─────────
 7,006,652
```

(2) Determine additive compressions and subtractive compressions as follows:

Then:
$(a_1 + b_1) = 7$    $(a_2 + b_2) = 3$     [1]
$(c_1 + d_1) = 15$   $(c_2 + d_2) = 11$
$(a_1 - b_1) = -1$   $(a_2 - b_2) = -1$
$(c_1 - d_1) = -1$   $(c_2 - d_2) = -1$ (3) Determine primary partial products ($P1_{m,n}$) as follows:

$$P1_{1,1} = b_1 d_1 = 32 \quad P1_{2,1} = b_2 d_1 = 16$$
$$P1_{1,2} = b_1 d_2 = 24 \quad P1_{2,2} = b_2 d_2 = 12$$ [2]

|  |  | $a_2$ | $b_2$ | $a_1$ | $b_1$ |
|---|---|---|---|---|---|
| $\times$ |  | $c_2$ | $d_2$ | $c_1$ | $d_1$ |
|  |  |  |  |  |  |
|  |  | $d_1 a_2$ | $d_1 b_2$ | $d_1 a_2$ | $b_1 d_2$ |
|  | $c_1 a_2$ | $c_1 b_2$ | $c_1 a_2$ | $c_1 b_1$ |  |
|  | $d_2 a_2$ | $d_2 b_2$ | $d_2 a_1$ | $d_2 b_1$ |  |
| $c_2 a_2$ | $c_2 b_2$ | $c_2 a_1$ | $c_2 b_1$ |  |  |
| $a_2 c_2 +$ | $[a_2 d_2 + b_2 c_2] +$ | $[a_2 c_1 + b_2 d_2 + a_1 c_2] +$ | $[a_2 d_1 b_2 c_1 + a_1 d_2 + b_1 c_2] +$ | $[b_2 d_1 + a_1 c_1 + b_1 d_2] +$ | $[a_1 d_2 + b_1 c_1] +$ | $+ b_1 d_1$ |

(4) Determine additive factors ($F_{m,n}^+$) and subtractive factors ($F_{m,n}^-$) as follows:

(a) $(a_1 + b_1)(c_1 + d_1) = a_1 c_1 + b_1 c_1 + a_1 d_1 + b_1 + d_1 = 105 = P2_{1,1}$ [4]
$(a_1 - b_1)(c_1 - d_1) = a_1 c_1 - b_1 c_1 - a_1 d_1 + b_1 + d_1 = +1 = P3_{1,1}$ $P2_{1,1} + P3_{1,1} = [(a_1 + b_1)(c_1 + d_1)] + [(a_1 - b_1)(c_1 - d_1)]$ $P2_{1,1} + P3_{1,1} = 2a_1 c_1 + 2b_1 d_1 = 106$
$\quad a_1 c_1 + b_1 d_1 = 53$
$\quad a_1 c_1 = 53 - b_1 d_1$
$\quad a_1 c_1 = 53 - 32 = 21 = F_{1,1}^+$
$P2_{1,1} - P3_{1,1} = [(a_1 + b_1)(c_1 + d_1)] - [(a_1 - b_1)(c_1 - d_1)]$
$P2_{1,1} - P3_{1,1} = 2b_1 c_1 + 2a_1 d_1 = 104$
$\quad b_1 c_1 + a_1 d_1 = 52 = F_{1,1}^-$ (b) $(a_1 + b_1)(c_2 + d_2) = a_1 c_2 + b_1 c_2 + a_1 d_2 + b_1 + d_2 = 77 = P2_{1,2}$
$(a_1 - b_1)(c_2 - d_2) = a_1 c_2 - b_1 c_2 - a_1 d_2 + b_1 + d_2 = +1 = P3_{1,2}$
$P2_{1,2} + P3_{1,2} = [(a_1 + b_1)(c_2 + d_2)] + [(a_1 - b_1)(c_2 - d_2)]$
$P2_{1,2} + P3_{1,2} = 2a_1 c_2 + 2b_1 d_2 = 78$
$\quad a_1 c_2 + b_1 d_2 = 39$
$\quad a_1 c_2 = 39 - b_1 d_2$
$\quad a_1 c_2 = 39 - 24 = 15 = F_{1,2}^+$
$P2_{1,2} - P3_{1,2} = [(a_1 + b_1)(c_2 + d_2)] - [(a_1 - b_1)(c_2 - d_2)]$
$P2_{1,2} - P3_{1,2} = 2b_1 c_2 + 2a_1 d_2 = 76$
$\quad b_1 c_2 + a_1 d_2 = 38 = F_{1,2}^-$ (c) $(a_2 + b_2)(c_1 + d_1) = a_2 c_1 + b_1 c_1 + a_2 d_1 + b_2 + d_1 = 45 = P2_{2,1}$
$(a_2 - b_2)(c_1 - d_1) = a_2 c_1 - b_2 c_1 - a_2 d_1 + b_2 + d_1 = +1 = P3_{2,1}$
$P2_{2,1} + P3_{2,1} = [(a_2 + b_2)(c_1 + d_1)] + [(a_2 - b_2)(c_1 - d_1)]$
$P2_{2,1} + P3_{2,1} = 2a_2 c_1 + 2b_2 d_1 = 46$
$\quad a_2 c_1 + b_2 d_1 = 23$
$\quad a_2 c_1 = 23 - b_2 d_1$
$\quad a_2 c_1 = 23 - 16 = 7 = F_{2,1}^+$
$P2_{2,1} + P3_{2,1} = [(a_2 + b_2)(c_1 + d_1)] - [(a_2 - b_2)(c_1 - d_1)]$
$P2_{2,1} + P3_{2,1} = 2b_2 c_1 + 2a_2 d_1 = 44$
$\quad b_2 c_1 + a_2 d_1 = 22 = F_{2,1}^-$ (d) $(a_2 + b_2)(c_2 + d_2) = a_2 c_2 + b_2 c_2 + a_2 d_2 + b_2 + d_2 = 33 = P2_{2,2}$
$(a_2 - b_2)(c_2 - d_2) = a_2 c_2 - b_2 c_2 - a_2 d_2 + b_2 + d_2 = +1 = P3_{2,2}$
$P2_{2,2} + P3_{2,2} = [(a_2 + b_2)(c_2 + d_2)] + [(a_2 - b_2)(c_2 - d_2)]$
$P2_{2,2} + P3_{2,2} = 2a_2 c_2 + 2b_2 d_2 = 34$
$\quad a_2 c_2 + b_2 d_2 = 17$
$\quad a_2 c_2 = 17 - b_2 d_2$
$\quad a_2 c_2 = 17 - 12 = 5 = F_{2,2}^+$
$P2_{2,2} - P3_{2,2} = [(a_2 + b_2)(c_2 + d_2)] - [(a_2 - b_2)(c_2 - d_2)]$
$P2_{2,2} - P3_{2,2} = 2b_2 c_2 + 2a_2 d_2 = 32$
$\quad b_2 c_2 + a_2 d_2 = 16 = F_{2,2}^-$ (5) Accumulation of the determined terms in a plurality of register cells, hierarchically arranged according to significance, is determined as follows:

(a) Generally, according to generally accepted methods of manual multiplication:

|  |  | $a_2$ | $b_2$ | $a_1$ | $b_1$ |
|---|---|---|---|---|---|
| $\times$ |  | $c_2$ | $d_2$ | $c_1$ | $d_1$ |
|  |  | $d_1 a_2$ | $d_1 b_2$ | $d_1 a_2$ | $b_1 d_2$ |
|  | $c_1 a_2$ | $c_1 b_2$ | $c_1 a_2$ | $c_1 b_1$ |  |
|  | $d_2 a_2$ | $d_2 b_2$ | $d_2 a_1$ | $d_2 b_1$ |  |
| $c_2 a_2$ | $c_2 b_2$ | $c_2 a_1$ | $c_2 b_1$ |  |  |
| $a_2 c_2 +$ | $[a_2 d_2 + b_2 c_2] +$ | $[a_2 c_1 + b_2 d_2 + a_1 c_2] +$ | $[a_2 d_1 b_2 c_1 + a_1 d_2 + b_1 c_2] +$ | $[b_2 d_1 + a_1 c_1 + b_1 d_2] +$ | $[a_1 d_2 + b_1 c_1] +$ | $+ b_1 d_1$ |

(b) Thus, the array of register cells is set up for accumulating values as follows:

| $r_7$ | $r_6$ | $r_5$ | $r_4$ | $r_3$ | $r_2$ | $r_1$ |
|---|---|---|---|---|---|---|
| $a_2 c_2 +$ | $[a_2 d_2 + b_2 c_2] +$ | $[a_2 c_1 + b_2 d_2 + a_1 c_2] +$ | $[a_2 d_1 b_2 c_1 + a_1 d_2 + b_1 c_2] +$ | $[b_2 d_1 + a_1 c_1 + b_1 d_2] +$ | $[a_1 d_2 + b_1 c_1] +$ | $+ b_1 d_1$ |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "$b_m$", "$b_m$" and "$d_n$" are required to have an equal number of digits.

| 5 | 16 | 7 | 12 | 15 | 22 | 38 | 16 | 21 | 24 | 52 | 32 |
|---|---|---|---|---|---|---|---|---|---|---|---|
| COMBINE TERM FACTORS AND EFFECT SHIFTING ACCUMULATION ||||||||||||
| 5 | 16 |  | 34 |  | 60 |  | 61 |  | 52 |  | 32 |
| 2 | 4 |  | 6 |  | 6 |  | 5 |  | 3 |  | 1 |
| 7 | 20 |  | 40 |  | 66 |  | 66 |  | 55 |  | 1 |
| ↓ | ↓ |  | ↓ |  | ↓ |  | ↓ |  | ↓ |  | ↓ |
| 7 | 0 |  | 0 |  | 6 |  | 6 |  | 5 |  | 2 |

(7) The contents of the register contain the correct answer (7,006,652), and are available for further processing by shifting the contents from the array of register cells, either serially or in parallel, as appropriate.

Inspection of the generally accepted manual method of multiplication reveals a simplified approach to the above-described method of the present invention and gives rise to an alternate embodiment of that method. Specifically, for example, for a 4-digit number, the register set-up is determined as:

|  |  |  |  | $a_2$ | $b_2$ | $a_1$ | $b_1$ |
|---|---|---|---|---|---|---|---|
|  | $\times$ |  |  | $c_2$ | $d_2$ | $c_1$ | $d_1$ |
|  |  |  |  | $a_2 d_1$ | $b_2 d_1$ | $a_1 d_1$ | $b_1 d_1$ |
|  |  |  | $a_2 c_1$ | $b_2 c_1$ | $a_1 c_1$ | $b_1 c_1$ |  |
|  |  | $a_2 d_2$ | $b_2 d_2$ | $a_1 d_2$ | $b_1 d_2$ |  |  |
|  | $a_2 c_2$ | $b_2 c_2$ | $a_1 c_2$ | $b_1 c_2$ |  |  |  |
| Register Cell | $r_7$ | $r_6$ | $r_5$ | $r_4$ | $r_3$ | $r_2$ | $r_1$ |

The "skewed matrix" resulting from such an application of a manual multiplication technique may be written as a square matrix: (4-digit number, n=2)

| $a_2 d_1$ | $b_2 d_1$ | $a_1 d_1$ | $b_1 d_1$ |
| $a_2 c_1$ | $b_2 c_1$ | $a_1 c_1$ | $b_1 c_1$ |
| $a_2 d_2$ | $b_2 d_2$ | $a_1 d_2$ | $b_1 d_2$ |

-continued

| $a_2c_2$ | $b_2c_2$ | $a_1c_2$ | $b_1c_2$ |   |
|---|---|---|---|---|

The register set-up previously described in connection with the first embodiment of the method of the present invention is found on the diagonals. Note that the Primary Partial Products ($P1_{m,n}$), the Additive Factors ($F_{m,n}^+$), and the Subtractive Factors ($F_{m,n}^-$) are found on diagonals also.

|  |  |  | ← columns |  |
|---|---|---|---|---|
| -4- | -3- | -2- | -1- | rows ↓ |
| $a_2d_1$ | $b_2d_1$ | $a_1d_1$ | $b_1d_1$ | -1- |
| $a_2c_1$ | $b_2c_1$ | $a_1c_1$ | $b_1c_1$ | -2- |
| $a_2d_2$ | $b_2d_2$ | $a_1d_2$ | $b_1d_2$ | -3- |
| $a_2c_2$ | $b_2c_2$ | $a_1c_2$ | $b_1c_2$ | -4- |

That is, a diagonal extending through (Col. 1, Row 1) contains $P1_{1,1}$ ($b_1d_1$); values on this diagonal accumulate in register cell $r_1$.

The diagonal extending from (Col. 2, Row 1) to (Col. 1, Row 2) contains $F_{1,1}^-(a_1d_1+b_1c_1)$; values on this diagonal accumulate in register cell $r_2$.

The diagonal extending from (Col. 3, Row 1) to (Col. 1, Row 3) contains $P1_{2,1}$ ($b_2d_1$); $F_{1,1}^+(a_1c_1)$, and $P1_{1,2}$ ($b_1d_2$); values on this diagonal accumulate in register cell $r_3$.

The diagonal extending from (Col 4, Row 1) to (Col. 1, Row 4) contains $F_{2,1}^-(a_2d_1+b_2c_1)$ and $F_{1,2}^-(a_1d_2+b_1c_2)$; values on this diagonal accumulate in register cell $r_4$.

The diagonal extending from (Col. 4, Row 2) to (Col. 2, Row 4) contains $F_{2,1}^+(a_2c_1)$, $P1_{2,2}$ ($b_2d_2$), and $F_{1,2}^+(a_1c_2)$; values on this diagonal accumulate in register cell $r_5$.

The diagonal extending from (Col. 4, Row 3) to (Col. 3, Row 4) contains $F_{2,2}^-(a_2d_2+b_2c_2)$; values on this diagonal accumulate in register cell $r_6$.

A diagonal through (Col. 4, Row 4) contains $F_{2,2}^+(a_2c_2)$; values on this diagonal accumulate in register cell $r_7$.

Thus, for example, for a 6-digit number, were $n=3$, a square matrix may be set-up as follows:

|  |  |  |  |  | ← columns |  |
|---|---|---|---|---|---|---|
| -6- | -5- | -4- | -3- | -2- | -1- | rows ↓ |
| $a_3d_1$ | $b_3d_1$ | $a_2d_1$ | $b_2d_1$ | $a_1d_1$ | $b_1d_1$ | -1- |
| $a_3c_1$ | $b_3c_1$ | $a_2c_1$ | $b_2c_1$ | $a_1c_1$ | $b_1c_1$ | -2- |
| $a_3d_2$ | $b_3d_2$ | $a_2d_2$ | $b_2d_2$ | $a_1d_2$ | $b_1d_2$ | -3- |
| $a_3c_2$ | $b_3c_2$ | $a_2c_2$ | $b_2c_2$ | $a_1c_2$ | $b_1c_2$ | -4- |
| $a_3d_3$ | $b_3d_3$ | $a_2d_3$ | $b_2d_3$ | $a_1d_3$ | $b_1d_3$ | -5- |
| $a_3c_3$ | $b_3c_3$ | $a_2c_3$ | $b_2c_3$ | $a_1c_3$ | $b_1c_3$ | -6- |

Also, for example, for an 8-digit number, where $n=4$, a square matrix may be set-up as follows:

|  |  |  |  |  |  | ← columns |  |  |
|---|---|---|---|---|---|---|---|---|
| -8- | -7- | -6- | -5- | -4- | -3- | -2- | -1- | rows ↓ |
| $a_4d_1$ | $b_4d_1$ | $a_3d_1$ | $b_3d_1$ | $a_2d_1$ | $b_2d_1$ | $a_1d_1$ | $b_1d_1$ | -1- |
| $a_4c_1$ | $b_4c_1$ | $a_3c_1$ | $b_3c_1$ | $a_2c_1$ | $b_2c_1$ | $a_1c_1$ | $b_1c_1$ | -2- |
| $a_4d_2$ | $b_4d_2$ | $a_3d_2$ | $b_3d_2$ | $a_2d_2$ | $b_2d_2$ | $a_1d_2$ | $b_1d_2$ | -3- |
| $a_4c_2$ | $b_4c_2$ | $a_3c_2$ | $b_3c_2$ | $a_2c_2$ | $b_2c_2$ | $a_1c_2$ | $b_1c_2$ | -4- |
| $a_4d_3$ | $b_4d_3$ | $a_3d_3$ | $b_3d_3$ | $a_2d_3$ | $b_2d_3$ | $a_1d_3$ | $b_1d_3$ | -5- |
| $a_4c_3$ | $b_4c_3$ | $a_3c_3$ | $b_3c_3$ | $a_2c_3$ | $b_2c_3$ | $a_1c_3$ | $b_1c_3$ | -6- |
| $a_4d_4$ | $b_4d_4$ | $a_3d_4$ | $b_3d_4$ | $a_2d_4$ | $b_2d_4$ | $a_1d_4$ | $b_1d_4$ | -7- |
| $a_4c_4$ | $b_4c_4$ | $a_3c_4$ | $b_3c_4$ | $a_2c_4$ | $b_2c_4$ | $a_1c_4$ | $b_1c_4$ | -8- |

The register set-ups may be seen to lie along diagonals, and may be expressed in the following format (cases for $n=2$, $n=3$, and $n=4$ are tabulated for ease of comparison):

| | $r_{15}$ | $r_{14}$ | $r_{13}$ | $r_{12}$ | $r_{11}$ | $r_{10}$ | $r_9$ | $r_8$ | $r_7$ | $r_6$ | $r_5$ | $r_4$ | $r_3$ | $r_2$ | $r_1$ |
|---|---|---|---|---|---|---|---|---|---|---|---|---|---|---|---|
| n = 2 | | | | | | | | | $F^+_{2,2}$ | $F^-_{2,2}$ | $Pl_{2,2}$ $F^+_{1,2}$ $F^+_{2,1}$ | $F^-_{1,2}$ $F^-_{2,1}$ | $Pl_{1,2}$ $Pl_{2,1}$ $F^+_{1,1}$ | $F^-_{1,1}$ | $Pl_{1,1}$ |
| n = 3 | | | | | $F^+_{3,3}$ | $F^-_{3,3}$ | $Pl_{3,3}$ $F^+_{2,3}$ $F^+_{3,2}$ | $F^-_{2,3}$ $F^-_{3,2}$ | $Pl_{2,3}$ $Pl_{3,2}$ $F^+_{1,3}$ $F^+_{3,1}$ $F^+_{2,2}$ | $F^-_{1,3}$ $F^-_{3,1}$ $F^-_{2,2}$ | $Pl_{1,3}$ $Pl_{2,2}$ $Pl_{3,1}$ $F^+_{1,2}$ $F^+_{2,1}$ | $F^-_{1,2}$ $F^-_{2,1}$ | $Pl_{1,2}$ $Pl_{2,1}$ $F^+_{1,1}$ | $F^-_{1,1}$ | $Pl_{1,1}$ |
| n = 4 | $F^+_{4,4}$ | $F^-_{4,4}$ | $Pl_{4,4}$ $F^+_{3,4}$ $F^+_{4,3}$ | $F^-_{3,4}$ $F^-_{4,3}$ | $Pl_{3,4}$ $Pl_{4,3}$ $F^+_{2,4}$ $F^+_{4,2}$ $F^+_{3,3}$ | $F^-_{2,4}$ $F^-_{4,2}$ $F^-_{3,3}$ | $Pl_{2,4}$ $Pl_{3,3}$ $Pl_{4,2}$ $F^+_{1,4}$ $F^+_{4,1}$ $F^+_{2,3}$ $F^+_{3,2}$ $F^+_{4,1}$ | $F^-_{1,4}$ $F^-_{2,3}$ $F^-_{3,2}$ $F^-_{4,1}$ | $Pl_{1,4}$ $Pl_{2,3}$ $Pl_{3,2}$ $Pl_{4,1}$ $F^+_{1,3}$ $F^+_{3,1}$ $F^+_{2,2}$ | $F^-_{1,3}$ $F^-_{3,1}$ $F^-_{2,2}$ | $Pl_{1,3}$ $Pl_{2,2}$ $Pl_{3,1}$ $F^+_{1,2}$ $F^+_{2,1}$ | $F^-_{1,2}$ $F^-_{2,1}$ | $Pl_{1,2}$ $Pl_{2,1}$ $F^+_{1,1}$ | $F^-_{1,1}$ | $Pl_{1,1}$ |

By inspection, the register set-up may be recognized as being effected according to the following relationships:

| Primary Partial Products: | $Pl_{m,n}$ | —[assigned to]→ | $r_{2(m+n)-3}$ |
|---|---|---|---|
| Subtractive Factors: | $F^-_{m,n}$ | —[assigned to]→ | $r_{2(m+n)-2}$ |
| Additive Factors: | $F^+_{m,n}$ | —[assigned to]→ | $r_{2(m+n)-1}$ |

A generalized case of a square matrix for determining register set-ups for multiplication of a first number and a second number according to the first embodiment of the method of the present invention is illustrated in FIG. 1. In FIG. 1, Columns numbered 1 through m are shown, indicating increasing significance from right to left, across the top of the square matrix; Rows numbered 1 through n are also shown, indicating increasing significance, from the top to the bottom of the square matrix.

The terms to be accumulated in respective registers $r_x$ are indicated as being found on parallel diagonals. For example, for the case of a number divided into four first segment-pairs and four second segment-pairs (i.e., where m=4 and n=4), a square matrix of eight columns and eight rows will provide the elements to be accumulated in respective registers along its diagonals running from (Col. m, Row 1) to (Col. 1, Row n), where m=n. Only those terms falling within the square 8×8 matrix (delineated by bold line 10 in FIG. 1) along the various diagonals will be accumulated in the appropriate registers. Once accumulation is effected, the shifting accumulation operation previously described in connection with the first embodiment of the method of the present invention is carried out.

Comparing the (column, row) numbers, instead of the subscripts (m,n) indicating combinational significance for the segment-pairs of the multiplicand and multiplier with register numbers, one can, by inspection, observe that the accumulation of terms, or partial products, in register cells is effected according to the diagram illustrated in FIG. 2. Referring to FIG. 2, registers $r_x$ are listed with the (column, row) location of the partial products to be accumulated in the respective registers tabulated co-linearly with the respective register to the right of the register $r_x$ into which they are accumulated. The sum of the column number and row number of each of the partial products accumulated within a respective register is tabulated co-linearly to the left of the respective register number, $r_x$. Inspection reveals that the (column, row) number sum ($\Sigma m+n$) always equals the register designation, x, increased by one. That is, $m+n=x+1$. Therefore, the register $r_x$ into which a given partial product is to be accumulated may be entirely determined by ascertaining its (column, row) location within an appropriate square matrix.

Accordingly, a simpler, preferred method for determining the product of two numbers according to the present invention does not require segmenting the multiplicand and multiplier into segment-pairs. According to the preferred method of the present invention, a first number (e.g., the multiplicand) has a plurality of first digits hierarchically arranged from a first least-significant place to a first most-significant place, and a second number (e.g., the multiplier) has a plurality of second digits hierarchically arranged from a second least-significant place to a second most-significant place. The preferred method comprises the steps of determining a plurality of partial products (treating blank places of the shorter of the two numbers as zeroes while determining the plurality of partial products), which plurality of partial products comprises a respective partial product for each pair-combination of the first digits and second digits. Each respective partial product thus has a combinational significance which is established by the significance of the first digit of the pair-combination involved in the respective partial product and by the significance of the second digit of the pair-combination involved in the respective partial product. A register is provided for storing information, which register has a plurality of register cells for storing accumulated values, each register cell having a hierarchical significance. Selected partial products are accumulated to produce accumulated values in specified register cells according to the following relationship:

$$P_{m,n}\text{—[accumulates in]}\to r_x; \quad x=(m+n)-1$$

where "$P_{m,n}$" represents a respective partial product, "m" represents the significance of the first digit of the pair-combination involved in the respective partial product (m=1, 2, 3, ... ), "n" represents the significance of the second digit of the pair-combination involved in the respective partial product (n=1, 2, 3, ... ), and "$r_x$" represents a specified register cell having a significance "x".

Then a shifting accumulation operation is effected in the register. The shifting accumulation operation comprises shifting specific digits of the accumulated value stored in a lesser-significant register cell to the next-higher-significant register cell of the register cells containing an accumulated value, and adding the specific digits to the accumulated value stored in the next-higher-significant register cell as least-significant digits. The specific digits shifted are those digits of the accumulated value stored in the lesser-significant register cell having higher significance than the least-significant digit of the accumulated value. The shifting accumulation operation is effected sequentially between significance-adjacent register cells from the least-significant register cell to the most-significant register cell containing an accumulated value. The result contained within the array of register cells after completion of the shifting accumulation operation is the product of the multiplicand and multiplier and is available for shifting, serially or in parallel, as required for further processing. The significance of the respective digits of the multiplicand and multiplier directly determine the location of each partial product in a square matrix, and the location in the square matrix determines into which register cell each partial product is accumulated for the shifting accumulation operation.

In fact, with the proper apparatus for practicing this preferred method, no matrix is required. The significances of the first digit and the second digit involved in a respective partial product determine into which register cell the partial product is to be accumulated according to the relationship, $x=(m+n)-1$.

Figure 3:
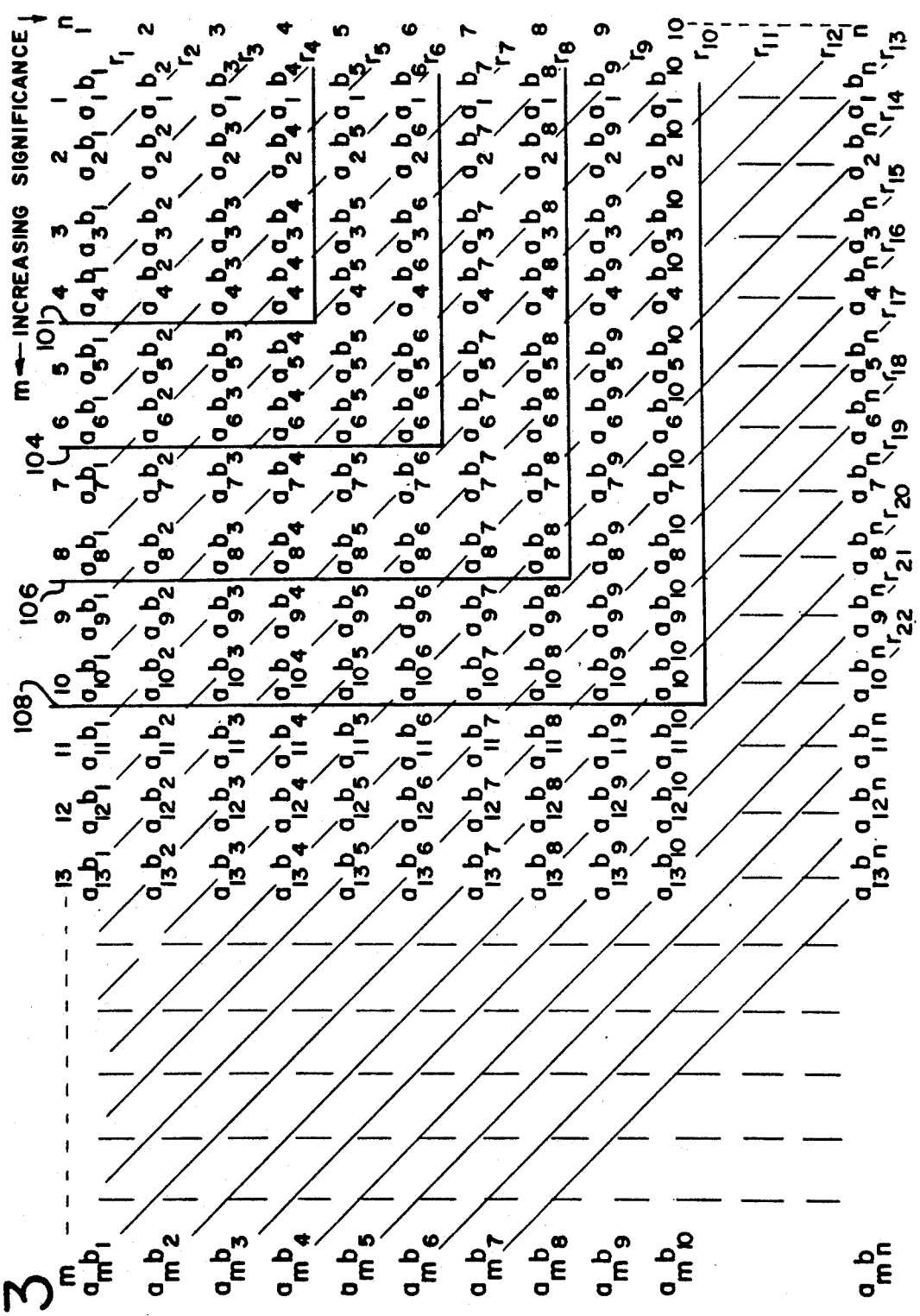
FIG. 3 is a representation of a generalized matrix for determining register set-ups according to the preferred embodiment of the method of the present invention.

FIG. 3 is a representation of a generalized square matrix for determining register set-ups according to the preferred method of the present invention. In FIG. 3, digits of a first number (e.g., the multiplicand) are indicated as $a_m$ ("m" indicates the significance of the first digit; m=1, 2, 3, ... ) and digits of a second number (e.g., the multiplier) are indicated as $b_n$ ("n" indicates the significance of the second digit; n=1, 2, 3, ... ). By such arrangement, the significances of the respective first digits are directly correlative with the column number of the square matrix of FIG. 3, and the significances of the respective second digits are directly correlative with the row number of the square matrix of FIG. 3. Accordingly, a four-digit number may be represented by the 4×4 square matrix included within bold line 101, and diagonals running from (Col. m, Row 1) to (Col. 1, Row n), where m=n, in the generalized square matrix of FIG. 3 identify partial products within the 4x4 matrix defined by bold line 101 to be accumulated in specified register cells, $r_x$. The mat illustrated in FIG. 3 is not essential to the practice of the preferred method, but is helpful in illustrating and explaining the practice of the method. That is, placement of partial products within the square matrix of FIG. 3 is entirely dependent upon the combinational significance of the first digit and second digit of the pair-combination involved in a respective partial product; the (column, row) designation (m,n) entirely identifies the respective register cell into which a respective partial product is to be accumulated. Therefore, the combinational significance of a respective partial product entirely identifies the register cell into which the respective partial product is to be accumulated, and no matrix need be employed as an interim step or device for determining the register cell in which a respective partial product is to be accumulated.

In similar fashion, the product of a 6-digit multiplicand and a 6-digit multiplier can be determined by a square matrix defined by bold line 104 in FIG. 3 defining a 6×6 square matrix. The product of an 8-digit multiplicand and an 8-digit multiplier can be determined according to the preferred method of the present invention by a square 8×8 matrix defined by bold line 106 in FIG. 3; the product of a 10-digit multiplicand and a 10-digit multiplier may be determined by the square 10×10 matrix defined by bold line 108 in FIG. 3.

Thus, certain design parameters of a system for multiplying two numbers can be easily ascertained merely by knowing the expected size of multiplicand-multiplier operations to be accommodated by the system. For example, referring again to FIG. 3, the diagonal indicating accumulation of terms in register $r_{17}$ passes through (column, row) position (4,4); a designer need only know that either the multiplicand or the multiplier will comprise 4 digits. Knowing that, and calculating $\Sigma m + n = x + 1$ yields $x = 7$. Thus, merely knowing that four digits will be involved in multiplication enables a designer to determine that he will be required to provide an array of 7 register cells to accommodate the preferred method of the present invention for a 4-digit multiplicand and 4-digit multiplier operation. Also, by determining the size of numbers required for a given multiplicand-multiplier operation, one can determine the number of multipliers required for determining the respective partial products involved in practicing the preferred method of the present invention. That is, for a 4-digit operation (requiring a 4×4 matrix), 16 partial products are calculated. A system designer may choose to provide 16 multipliers, thereby allowing single-clock cycle determination of the 16 partial products required, or a lesser number of multipliers may be provided to enable multi-clock cycle determination of the required 16 partial products. Moreover, since single-digit multiplications only are involved in determining partial products, only 4×4 multipliers are required. Thus, instead of a 256-bit (i.e., 16×16) multiplier for 4-digit multiplication operations, as would be required for a prior art multiplier apparatus, a designer may opt to employ only eight 4×4 multipliers (i.e., only 8×4×3=128 bits of area occupied) and save "real estate".

Still further, control software or hardware may be programmed to power-up only the multipliers and register cells needed for a particular multiplication operation. Thus, for example, a 4×4 system may accommodate a 2-digit multiplication operation and only power-up the necessary multipliers (i.e., only $m \times n = 2 \times 2 = 4$ multipliers are required), and only the necessary register cells need be powered-up (i.e., only $(m+n-1=2+2-1=3$ register cells are required).

Proper selection of the number of multipliers employed in distributive determination of partial products may actually speed the multiplication operation since numerous lower order multiplication operations to determine partial products occur simultaneously. Thus, if a designer elects to accommodate 4×4 multiplication operation (i.e., to multiply 4-digit numbers) using sixteen 4×4 multipliers (real estate occupancy=16×4×4=256 bits), while no real estate occupancy advantage is realized over the prior art, the multiplication operation will be completed in fewer clock cycles.

Another aspect of the present invention is an apparatus for carrying out the method of the present invention.

Figures 4, 7:
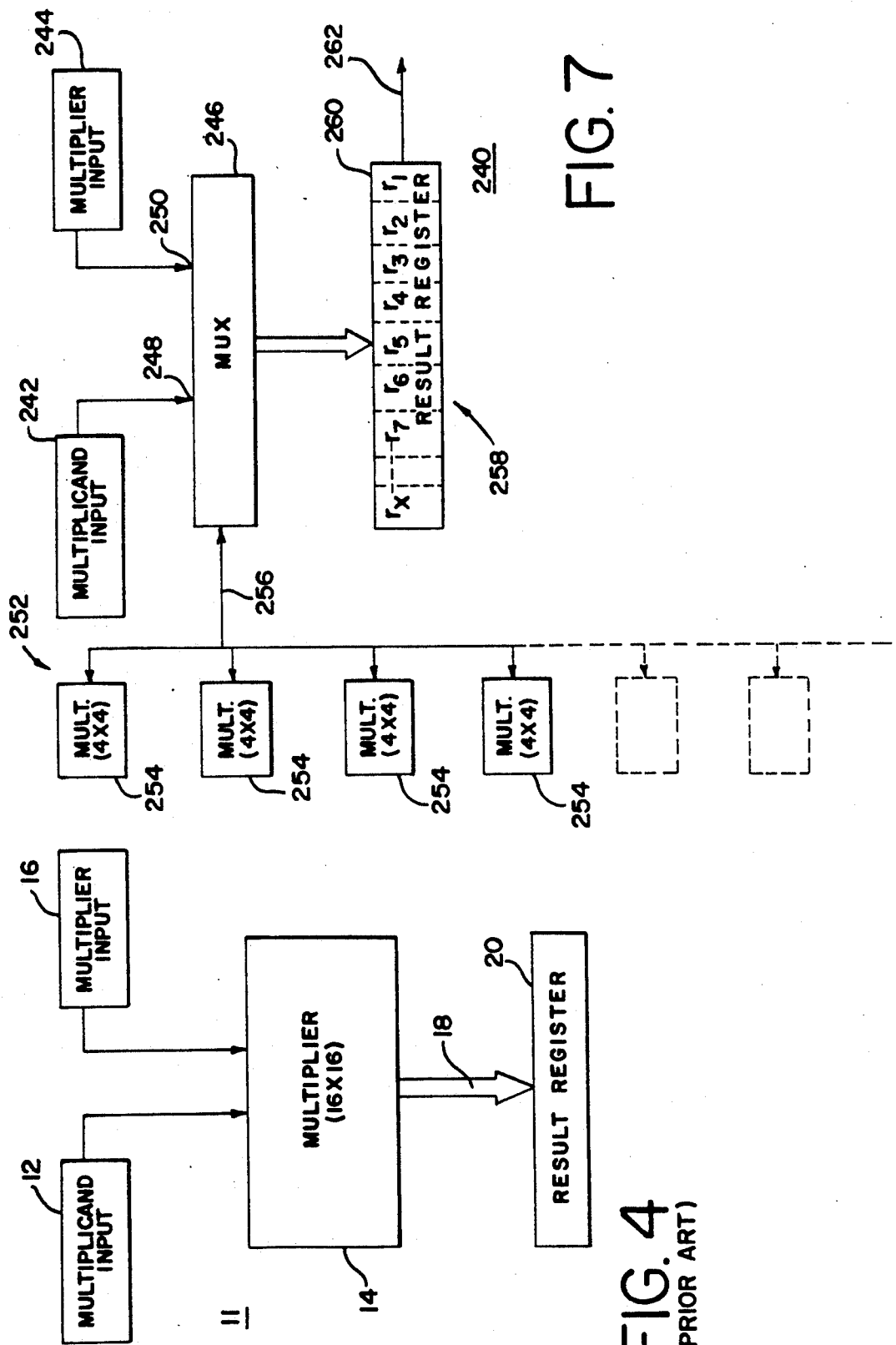
FIG. 4 is a schematic block diagram of a prior art apparatus for determining the product of two numbers.
FIG. 7 is a schematic block diagram of an apparatus for carrying out the preferred embodiment of the method of the present invention.

FIG. 4 is a schematic block diagram of a prior art apparatus for determining the product of two numbers. In FIG. 4, a multiplier apparatus 11 is illustrated comprising a multiplicand input 12 providing a multiplicand to a multiplier unit 14 and a multiplier input 16 providing a multiplier to multiplier unit 14. Multiplier unit 14 produces a result representing the product of the multiplicand and the multiplier via bus 18 to a result register 20. Multiplier unit 14 is large enough to accommodate a predetermined size of multiplicand and multiplier. For example, to accommodate a 4-digit multiplicand and a 4-digit multiplier, multiplier unit 14 must be a 16×16 bit multiplier. That is, in a prior art multiplier apparatus, such as multiplier apparatus 11 of FIG. 4, the multiplier unit 14 comprises 16 columns of transistors, each column having 16 rows of transistors, with additional rows, or columns, or both to accommodate carries and other overhead operations involved in multiplication.

Figure 5:
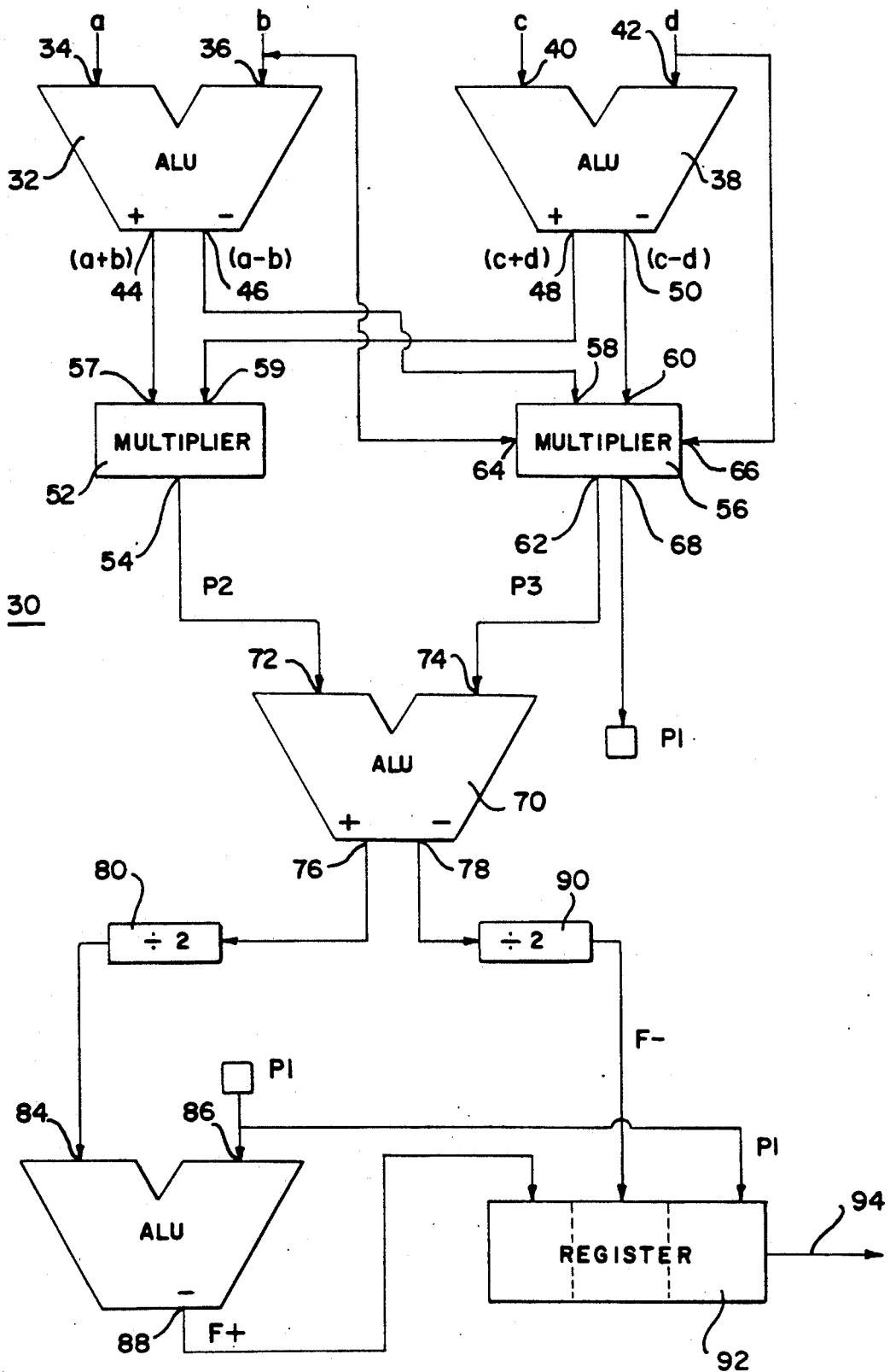
FIG. 5 is a schematic diagram of an apparatus for practicing the first embodiment of the method of the present invention in which the first number is segmented into a single first segment-pair and the second number is segmented into a single second segment-pair.

FIG. 5 is a schematic diagram of an apparatus for practicing the first embodiment of the method of the present invention in which the first number is segmented into a single first segment-pair and the second number is segmented into a single second segment-pair. Such segmentation was illustrated and discussed in connection with Examples I through IV. In FIG. 5, a multiplier apparatus 30 is illustrated comprising an arithmetic logic unit (ALU) 32 receiving higher significance segment "a" of the first segment-pair (a,b) at an input 34 and receiving lower significance segment "b" of the first segment-pair (a,b) at an input 36.

An ALU 38 receives the higher significance segment "c" of second segment-pair (c,d) at an input 40 and receives lower significance segment "d" of second segment-pair (c,d) at an input 42. ALU 32 has a summing output 44 at which is produced the sum (a+b), and a difference output 46 at which is produced the difference (a−b). ALU 38 has a summing output 48 at which is produced the sum (c+d), and a difference output 50 at which is produced the difference (c−d).

A multiplier 52 is connected to receive summing output 44 of ALU 32 at an input 57, and is connected to receive summing output 48 of ALU 38 at an input 59. Multiplier 52 produces a secondary partial product $(P2=[a+b][c+d])$ at an output 54. A multiplier 56 is connected to receive difference output 46 of ALU 32 at an input 58 is connected to receive difference output 50 of ALU 38 at an input 60. Multiplier 56 produces a tertiary partial product $(P3=[a-b][c-d])$ at an output 62. Multiplier 56 also receives the quantity "b" from input 36 of ALU 32 at an input 64, and receives the quantity "d"60 from input 42 of ALU 38 at an input 66. Multiplier produces a primary partial product P1 (P1=bd) at an output 68.

An ALU 70 receives secondary partial product P2 from output 54 of multiplier 52 at an input 72, and receives tertiary partial product P3 from output 62 of multiplier 56 at an input 74. ALU 70 has a summing output 76 and a difference output 78. The sum of secondary partial product P2 and tertiary partial product P3 is produced at summing output 76, is divided by two by a divider 80, and is passed to an ALU 82 at an input 84. ALU 84 also receives primary partial product P1 from output 68 of multiplier 56 at an input 86 and produces at a difference output 88 additive factor F+ $(F^+ = [(P2+P3) \div 2] - P1)$.

The output produced at difference output 78 of ALU 70 is divided by two by a divider 90 to produce subtractive factor $F^-$ $(F^- = [(P2-P3) \div 2])$. Additive factor $F^+$, subtractive factor $F^-$, and primary partial product P1 are appropriately provided to a register 92 according to the relationships described in connection with the first embodiment of the method of the present invention. Register 92 performs the shifting accumulation operation described in connection with the description of the first embodiment of the method of the present invention to generate the product of the numbers represented by first segment-pair (a,b) and second segment-pair (c,d) at an output 94.

Figure 6:
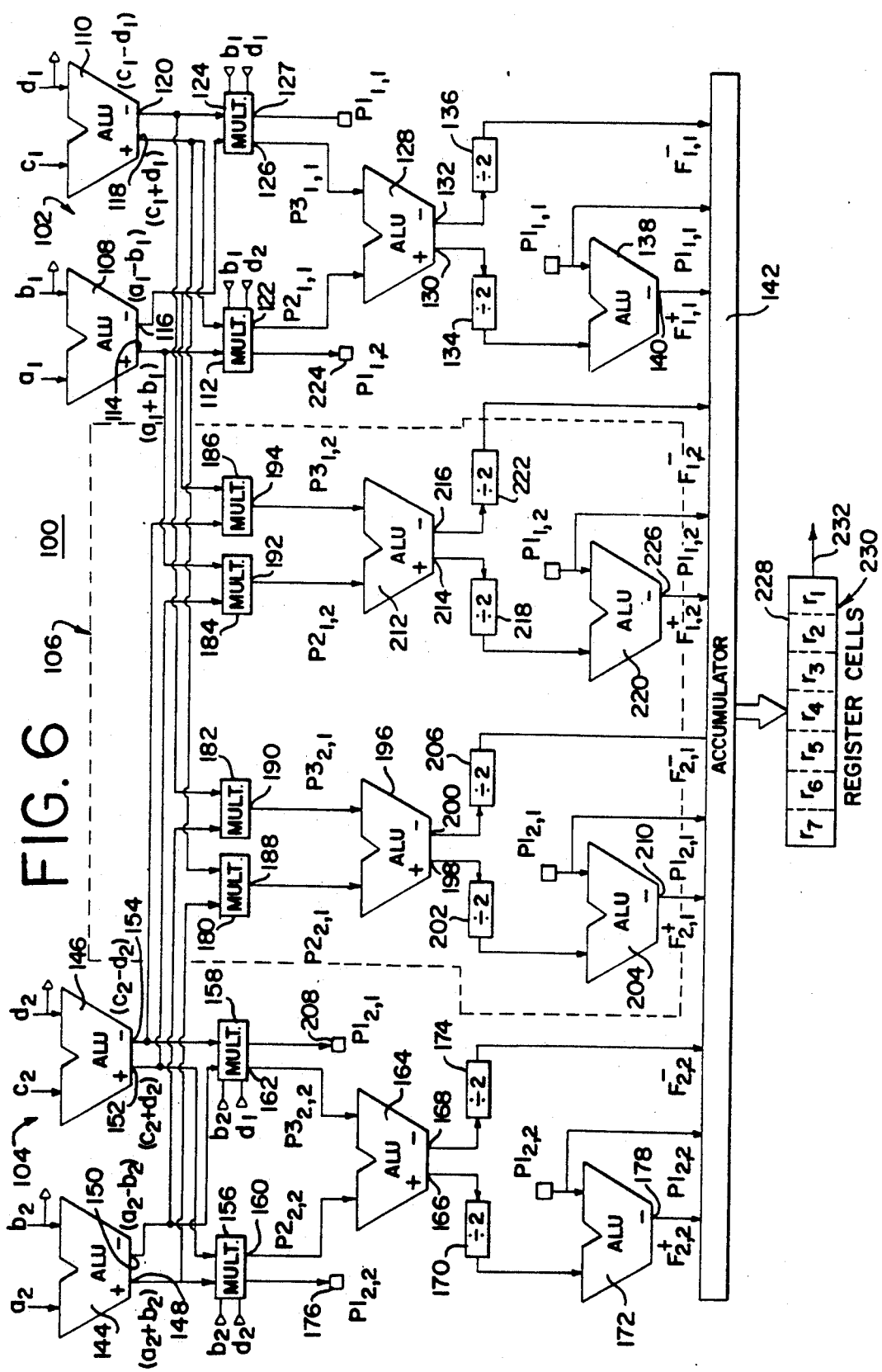
FIG. 6 is a schematic block diagram of an apparatus for practicing the first embodiment of the method of the present invention in which the multiplicand is segregated into first segment-pairs $(a_1,b_1)$ and $(a_2,b_2)$ and the multiplier is segregated into second segment-pairs $(c_1,d_1)$ and $(c_2,d_2)$.

FIG. 6 is a schematic block diagram of an apparatus for practicing the first embodiment of the method of the present invention in which the multiplicand is segregated into first segment-pairs $(a_1,b_1)$ and $(a_2,b_2)$, and the multiplier is segregated into second segment-pairs $(c_1,d_1)$ and $(c_2,d_2)$. In FIG. 6, a multiplier apparatus 100 is illustrated comprising a lower significance multiplier subsystem 102, a higher significance multiplier subsystem 104, and a cross-multiplying subsystem 106. Lower significance multiplier subsystem 102 and higher significance multiplier subsystem 104 are each substantially the same as multiplier apparatus 30, illustrated in FIG. 5.

Thus, lower significance multiplier subsystem 102 includes an ALU 108 receiving the higher-significance segment "$a_1$" and the lower-significance segment "$b_1$" of first segment-pair $(a_1,b_1)$ as inputs; and an ALU 110 receiving the higher-significance segment "$c_1$" and the lower-significance segment "$d_1$" of second segment-pair $(c_1,d_1)$ as inputs.

A multiplier 112 receives inputs from summing output 114 of ALU 108 and summing output 118 of ALU 110 to provide secondary partial product $P2_{1,1}$ ($P2_{1,1}=[a_1+b_1][c_1+d_1]$) at an output 122. A multiplier 124 receives inputs from difference output 116 of ALU 108 and difference output 120 of ALU 110 to provide tertiary partial produce $P3_{1,1}$ ($P3_{1,1}=[a_a-b_1[]c_1-d_1]$) at an output 126.

An ALU 128 receives secondary partial product $P2_{1,1}$ from output 122 of multiplier 112 and tertiary partial product $P3_{1,1}$ from output 126 of multiplier 124 as inputs. The quantity ($P2_{1,1}+P3_{1,1}$) is provided at summing output 130 of ALU 128, is divided by two by a divider 134, and is provided as an input to an ALU 138. Quantity "$b_1$" and quantity "$d_1$" are provided to multiplier 124 so that multiplier 124 provides primary partial product $P1_{1,1}$ ($P1_{1,1}=b_1d_1$) at an output 127. $P1_{1,1}$ is provided as an input to ALU 138 and is provided for accumulation in an accumulator 142. Difference output 140 of ALU 138 provides additive factor $F_{1,1}^+$ ($F_{1,1}^+=[(P2_{1,1}+P3_{1,1})\div 2]-P1_{1,1}$) for accumulation in accumulator 142. The quantity ($P2_{1,1}-P3_{1,1}$) is provided at difference output 132 of ALU 128 and is divided by two by a divider 136 to provide subtractive factor $F_{1,1}^-$ ($F_{1,1}^-=[P2_{1,1}-P3_{1,1}]\div 2$) for accumulation in accumulator 142.

Higher significance multiplier subsystem 104 includes an ALU 144 receiving higher-significance segment "$a_2$" and lower-significance segment "$b_2$" of first segment-pair $(a_2,b_2)$ as inputs. An ALU 146 receives higher-significance segment "$c_2$" and lower-significance segment "$d_2$" of second segment-pair $(c_2,d_2)$ as inputs. A multiplier 156 receives inputs from summing output 148 of ALU 144 and summing output 152 of ALU 146. A multiplier 158 receives inputs from difference output 150 of ALU 144 and difference output 154 of ALU 146. Multiplier 156 produces secondary partial product $P2_{2,2}$ ($P2_{2,2}=[a_2+b_2][c_2+d_2]$) at an output 160, and multiplier 158 produces tertiary partial product $P3_{2,2}$ ($P3_{2,2}=[a_2-b_2][c_2-d_2]$) at an output 162.

An ALU 164 receives secondary partial product $P2_{2,2}$ from output 160 of multiplier 156 and tertiary partial product $P3_{2,2}$ from output 162 of multiplier 158 as inputs. The quantity ($P2_{2,2}+P3_{2,2}$) is produced at summing output 166 of ALU 164, is divided by two by a divider 170, and is provided as an input to an ALU 172. The quantity ($P2_{2,2}-P3_{2,2}$) is produced at difference output 168 of ALU 164 and is divided by two by a divider 174 to provide subtractive factor $F_{2,2}^-$ ($F_{2,2}^-=[P2_{2,2}-P3_{2,2}]\div 2$) for accumulation in accumulator 142. Multiplier 156 receives quantity "$b_2$" and quantity "$d_2$" as inputs and produces primary partial product $P1_{2,2}$ ($P1_{2,2}=b_2d_2$) at an output 176. Output 176 is operatively connected to provide primary partial product $P1_{2,2}$ as an input to ALU 172 and to provide $P1_{2,2}$ for accumulation in accumulator 142. Difference output 178 of ALU 172 provides additive factor $F_{2,2}^+$ ($F_{2,2}^+=[P2_{2,2}+P3_{2,2}]\div 2-P1_{2,2}$) for accumulation in accumulator 142.

Cross-multiplying subsystem 106 includes multipliers 180, 182, 184, and 186. Multiplier 180 receives as inputs the quantity ($a_2+b_2$) produced at summing output 148 of ALU 144 and the quantity ($c_1+d_1$) produced at summing output 118 of ALU 110, and produces secondary partial product $P2_{2,1}$ ($P2_{2,1}=[a_2+b_2][c_1+d_1]$) at an output 188. Multiplier 182 receives as inputs the quantity ($a_2-b_2$) produced at difference output 150 of ALU 144 and the quantity ($c_1-d_1$) produced at difference output 120 of ALU 110, and produces tertiary partial product $P3_{2,1}$ ($P3_{2,1}=[a_2b_2][c_1-d_1]$) at an output 190. Multiplier 184 receives as inputs the quantity ($c_2+d_2$) produced at summing output 152 of ALU 146 and the quantity ($a_1+b_1$) produced at summing output 114 of ALU 108, and produces secondary partial product $P2_{1,2}$ ($P2_{1,2}=[a_1+b_1][c_2+d_2]$) at an output 192. Multiplier 186 receives as inputs the quantity ($c_2-d_1$) produced at difference output 154 of ALU 146 and the quantity ($a_1-b_1$) produced at difference output 116 of ALU 108, and produces tertiary partial product $P3_{1,2}$ ($P3_{1,2}=[a_1-b_1][c_2-d_2]$) at an output 194.

An ALU 196 receives secondary partial product $P2_{2,1}$ from output 188 of multiplier 180 and tertiary partial product $P3_{2,1}$ from output 190 of multiplier 182. The quantity ($P2_{2,1}+P3_{2,1}$) produced at summing output 198 of ALU 196 is divided by two by a divider 202 and provided as an input to an ALU 204. The quantity )$P2_{2,1}-P3_{2,1}$) produced at difference output 200 of ALU 196 is divided by two by a divider 206 to produce subtractive factor $F_{2,1}^-$ ($F_{2,1}^-=[P2_{2,1}-P3_{2,1}]\div 2$) for accumulation in accumulator 142.

Multiplier 158 receives as additional inputs the quantity "$b_2$" and the quantity "$d_1$" and produces primary partial product $P1_{2,1}$ ($P1_{2,1}=b_2d_1$) at an output 208. Output 208 is operatively connected to provide primary partial product $P1_{2,1}$ as an input to ALU 204 and to provide $P1_{2,1}$ for accumulation in accumulator 142. ALU 204 provides at its difference output 210 additive factor $F_{2,1}^+$ ($F_{2,1}^+=[P2_{2,1}+P3_{2,1}]\div 2-P1_{1,1}$) for accumulation in accumulator 142.

An ALU 212 receives secondary partial product $P2_{1,2}$ ($P2_{2,1}=[a_1+b_1][c_2+d_2]$) from output 192 of multiplier 184 and receive tertiary partial product $P3_{1,2}$ ($P3_{1,2}=[a_1-b_1][c_2-d_2]$) from output 194 of multiplier 186 as inputs. ALU 212 provides at its summing output 214 a quantity $P2_{1,2}+P3_{1,2}$) which is divided by two by a divider 218 and provided as an input to an ALU 220.

ALU 212 also provides at its difference output 216 a quantity $(P2_{1,2}-P3_{1,2})$ which is divided by two by a divider 222 to produce subtractive factor $F_{1,2}^-$ ($F_{1,2}^- = [P2_{1,2}-P3_{1,2}] \div 2$) for accumulation in accumulator 142.

Multiplier 112 receives as inputs the quantities "$b_1$" and "$d_2$" and produces primary partial product $P1_{1,2}$ ($P1_{1,2} = b_1 d_2$) at an output 224. Output 224 is operatively connected to provide primary partial product $P1_{1,2}$ as an input to ALU 220 and to provide $P1_{1,2}$ for accumulation in accumulator 142. ALU 220 produces at its difference output 226 additive factor $F_{1,2}^+$ ($F_{1,2}^+ = [P2_{1,2}+P3_{1,2}] \div 2 - P1_{1,2}$) for accumulation in accumulator 142.

Accumulator 142 accumulates the various primary partial products $P1_{m,n}$, additive factors $F_{m,n}^+$, and subtractive factors $F_{m,n}^-$ for storage in an array of register cells 230 within a register 228. Register 228 performs a shifting accumulation operation as described in connection with the description of the first embodiment of the method of the present invention and the number residing within register 228 after completion of the shifting accumulation operation is the product of the first number comprising first segment-pairs ($a_1,b_1$) and ($a_2,b_2$) and the second number comprising second segment-pairs ($c_1,d_1$) and ($c_2,d_2$). That product is available for shifting, either serially or in parallel as appropriate, via an output 232.

FIG. 7 is a schematic block diagram of an apparatus for carrying out the preferred embodiment of the method of the present invention. In FIG. 7, a multiplying apparatus 240 receives a multiplicand from a multiplicand input 242 and receives a multiplier from a multiplier input 244. The multiplicand is received by a multiplexer 246 at an input 248 and the multiplier is received at an input 250 of multiplexer 246.

An array 252 of multipliers 254 is operatively connected by a bus 256 with multiplexer 246. Multiplexer 246 is programmed to recognize the significances of the respective digits of the multiplicand and the multiplier received at inputs 248, 250 so that, after routing respective pair-combinations of multiplicand digits and multiplier digits to available multipliers 254 for multiplication to produce a respective partial product for each such pair-combination, and after receiving the respective partial products from the array 252 of multipliers 254 via bus 256, multiplexer 246 directs accumulation of respective partial products in appropriate register cells 258 in result register 260 according to the significance of the multiplicand digit and the significance of the multiplier digit of the pair-combination involved in each respective partial product.

Result register 260 effects a shifting accumulation operation as described in connection with the preferred embodiment of the method of the present invention and, after completion of the shifting accumulation operation, the number residing in the array of register cells 258 is the product of the multiplicand and multiplier inputs received at inputs 248, 250 of multiplexer 246. That result is available for shifting through an output 262, either serially or in parallel as appropriate, for use or further processing by a system employing multiplying apparatus 240.

It is to be understood that, while the detailed drawings and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

I claim:

1. A method for determining the product of a first number and a second number, said first number having a plurality of digits hierarchically arranged from a first least-significant place to a first most-significant place, said second number having a plurality of second digits hierarchically arranged from a second least-significant place to a second most-significant place, the method comprising the steps of:

(1) providing a logic means for determining a plurality of partial products;

(2) determining said plurality of partial products by said logic means, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

(3) providing an accumulator means for selectively accumulating selected partial products of said plurality of partial products;

(4) providing a register means for storing information, said register means comprising a plurality of register cell means for storing said accumulated values, each of said plurality of register cell means having a hierarchical significance;

(5) accumulating said selected partial products by said accumulator means to produce accumulated values for storing in specific register cell means of said plurality of register cell means according to the following relationships:

$$P_{m,n} - [\text{accumulates in}] \to r_x; \ x = (m+n) - 1$$

where "$P_{m,n}$" represents said selected partial product; "m" represents said first significance, m = 1, 2, . . . ; "n" represents said second significance, n = 1, 2, . . . ; "$r_x$" said specified register cell means having significance "x";

(6) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (7) shifting the contents of said plurality of register cell means from said plurality of register cell means.

2. A method for determining the product of a first number and a second number, said first number having a plurality of digits hierarchically arranged from a first least-significant place to a first most-significant place, said second number having a plurality of second digits hierarchically arranged from a second least-significant place to a second most-significant place, the method comprising the steps of:

(1) determining a plurality of partial products, treating blank places of the shorter number of said first number and said second number as zeroes while determining said plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

(2) providing an accumulator means for selectively accumulating selected partial products of said plurality of partial products;

(3) providing a register means for storing information, said register means comprising a plurality of register cell means for storing said accumulated values, each of said plurality of register cell means having a hierarchical significance;

(4) accumulating said selected partial products by said accumulator means to produce accumulated values for storing in specific register cell means of said plurality of register cell means according to the following relationships:

$$P_{m,n} \text{—[accumulates in]} \rightarrow r_x; \; x=(m+n)-1$$

where "$P_{m,n}$" represents said selected partial product; "m" represents said first significance, m=1, 2, . . . ; "n" represents said second significance, n=1, 2, . . . ; "$r_x$" represents said specified register cell means having significance "x";

(5) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (6) shifting the contents of said plurality of register cell means from said plurality of register cell means.

3. A method for determining the product of a first number and a second number, said first number having a plurality of digits hierarchically arranged from a first least-significant place to a first most-significant place, said second number having a plurality of second digits hierarchically arranged from a second least-significant place to a second most-significant place, the method comprising the steps of:

(1) providing a logic means for determining a plurality of partial products;

(2) determining said plurality of partial products by said logic means, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

(3) providing a register means for storing information, said register means comprising a plurality of register cell means for storing accumulated values, each of said plurality of register cell means having a hierarchical significance;

(4) accumulating selected partial products of said plurality of partial products to produce accumulated values in specified register cell means of said plurality of register cell means according to the following relationships:

$$P_{m,n} \text{—[accumulates in]} \rightarrow r_x; \; x=(m+n)-1$$

where "$P_{m,n}$" represents said selected partial product; "m" represents said first significance, m=1, 2, . . . ; "n" represents said second significance, n=1, 2, . . . ; "$r_x$" represents said specified register cell means having significance "x";

(5) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (6) shifting the contents of said plurality of register cell means from said plurality of register cell means.

4. A method for determining the product of a first number and a second number, said first number having a plurality of digits hierarchically arranged from a first least-significant place to a first most-significant place, said second number having a plurality of second digits hierarchically arranged from a second least-significant place to a second most-significant place, the method comprising the steps of:

(1) determining a plurality of partial products, treating blank places of the shorter number of said first number and said second number as zeroes while determining said plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

(2) providing a register means for storing information, said register means comprising a plurality of register cell means for storing accumulated values, each of said plurality of register cell means having a hierarchical significance;

(3) accumulating selected partial products of said plurality of partial products to produce accumulated values in specified register cell means of said plurality of register cell means according to the following relationships:

$$P_{m,n}\text{—[accumulates in]}\rightarrow r_x; \ x=(m+n)-1$$

where "$P_{m,n}$" represents said selected partial product; "m" represents said first significance, m=1, 2, ...; "n" represents said second significance, n=1, 2, ...; "$r_x$" represents said specified register cell means having significance "x";

(4) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (5) shifting the contents of said plurality of register cell means from said plurality of register cell means.

5. A method for determining the product of a first number and a second number, said first number having a plurality of digits hierarchically arranged from a first least-significant place to a first most-significant place, said second number having a plurality of second digits hierarchically arranged from a second least-significant place to a second most-significant place, the method comprising the steps of:

(1) determining a plurality of partial products, considering blank places of the shorter number of said first number and said second number as having a value of zero during said determining of said plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

(2) storing said plurality of partial products in a storage array, said storage array being operatively addressable as a matrix, said matrix having a plurality of columns and a plurality of rows, said plurality of partial products being stored within said matrix according to said combinational significance, said first significance determining a first order of storing of said plurality of partial products in one of said plurality of columns and said plurality of rows, said second significance determining a second order of storing said plurality of partial products in the other of said plurality of columns and said plurality of rows;

(3) providing a register means for storing information, said register means comprising a plurality of register cell means for storing accumulated values, said register means being operatively connected with said storage array, each of said plurality of register cell means having a hierarchical significance;

(4) accumulating selected partial products of said plurality of partial products in specified register cell means of said plurality of register cell means according to the following relationships:

$$P_{m,n}\text{—[accumulated in]}\rightarrow r_x; \ x=(m+n)-1$$

where "$P_{m,n}$" represents said selected partial product; "m" represents said first order of storing, m=1, 2, ...; "n" represents said second order of storing, n=1, 2, ...; "$r_x$" represents said specified register cell means having significance "x";

(5) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means within said register means from the least-significant register cell means to the most-significant register cell means within said register means; and (6) shifting the contents of said plurality of register cell means from said plurality of register cell means.

6. A method for determining the product of a first number and a second number, said first number having a plurality of digits hierarchically arranged from a first least-significant place to a first most-significant place, said second number having a plurality of second digits hierarchically arranged from a second least-significant place to a second most-significant place, the method comprising the steps of:

(1) providing a logic means for determining a plurality of partial products;

(2) determining said plurality of partial products by said logic means, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

(3) storing said plurality of partial products in a storage array, said storage array being operatively addressable as a matrix, said matrix having a plurality of columns and a plurality of rows, said plurality of partial products being stored within said matrix according to said combinational significance, said first significance determining a first order of storing of said plurality of partial products in one of said plurality of columns and said plurality of rows, said second significance determining a second order of storing said plurality of partial products in the other of said plurality of columns and said plurality of rows;

(4) providing a register means for storing information, said register means comprising a plurality of register cell means for storing accumulated values, said register means being operatively connected with said storage array, each of said plurality of register cell means having a hierarchical significance;

(5) accumulating selected partial products of said plurality of partial products in specified register cell means of said plurality of register cell means according to the following relationships:

$$P_{m,n} - [\text{accumulated in}] \rightarrow r_x;\ x = (m+n) - 1$$

where "$P_{m,n}$" represents said selected partial product; "m" represents said first order of storing, m = 1, 2, ...; "n" represents said second order of storing, n = 1, 2, ...; "$r_x$" represents said specified register cell means having significance "x";

(6) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means within said register means from the least-significant register cell means to the most-significant register cell means within said register means; and (7) shifting the contents of said plurality of register cell means from said plurality of register cell means.

7. A method for determining the product of a first number and a second number, said first number having a plurality of first digits hierarchically arranged from a least-significant place to a most-significant place, said second number having a plurality of second digits hierarchically arranged from a least-significant place to a most-significant place, the method comprising:

(1) zero-filling the most significant places of the shorter number of said first number and said second number appropriately that said first number and said second number occupy a like number of places;

(2) segmenting said first number into at least one first segment-pair, each respective first segment-pair of said at least one first segment-pair being representable by an expression $a_m, b_m$, where "a" represents a higher-significance first segment of said respective first segment-pair, where "b" represents a lower-significance first segment of said respective first segment-pair, and where "m" = 1, 2, 3, ..., and represents the significance of the respective first segment-pair within said first number; and segmenting said second number into at least one second segment-pair, each respective second segment-pair of said at least one second segment-pair being representable by an expression $c_n, d_n$, where "c" represents a higher-significance second segment of said respective second segment-pair, where "d" represents a lower-significance second segment of said respective second segment-pair, and where "n" = 1, 2, 3, ..., and represents the significance of the respective second segment-pair within said second number, all of said first segments and said second segments comprising an equal number of digits;

(3) determining a first additive compression for each of said at least one first segment-pairs, each said first additive compression being representable by an expression $(a_m + b_m)$, and determining a second additive compression for each of said at least one second segment-pair, each said second additive compression being representable by an expression $(c_n + d_n)$;

(4) determining a first subtractive compression for each of said at least one first segment-pair, each said first subtractive compression being representable by an expression $(a_m - b_m)$ and determining a second subtractive compression for each of said at least one second segment-pair, each said second subtractive compression being representable by an expression $(c_n - d_n)$;

(5) determining a set of primary partial products comprising the products of each lesser-significant segment of each of said at least one first segment-pairs with each lesser-significant segment of each of said at least one second segment-pairs, each of said set of primary partial products being representable by an expression $P1_{m,n}$, where $P1_{m,n} = b_m d_n$, and m,n establishes a combinational significance for each said primary partial product;

(6) determining a set of secondary partial products comprising the products of each of said first additive compressions with each of said second additive compressions, each of said set of secondary partial products being representable by an expression $P2_{m,n}$, where $$P2_{m,n} = (a_m + b_m)(c_n + d_n),$$

and m,n establishes a combinational significance for each said secondary partial product;

(7) determining a set of tertiary partial products comprising the products of each of said first subtractive compressions with each of said second subtractive compressions, each of said set of tertiary partial products being representable by an expression $P3_{m,n}$, where $$P3_{m,n}=(a_m-b_m)(c_n-d_n)$$

and m,n establishes a combinational significance for each said tertiary partial product;

(8) determining a set of additive factors, each of said additive factors comprising the sum of a specific secondary partial product of said plurality of secondary partial products with a specific tertiary partial product of said plurality of tertiary partial products, said specific secondary partial product and said specific tertiary partial product having the same combinational significance, dividing said sum by two, and subtracting an appropriate primary partial product of said set of primary partial products, said appropriate primary partial product having the same combinational significance as said specific secondary partial product, each of said plurality of additive factors being representable by an expression $F_{m,n}{}^+$, where $F_{m,n}{}^+ = [(P2_{m,n}+P3_{m,n})\div 2] - P1_{m,n}$;

(9) determining a plurality of subtractive factors, each of said subtractive factors comprising the difference of a specific secondary partial product of said plurality of secondary partial products less a specific tertiary partial product of said plurality of tertiary partial products, said specific secondary partial product and said specific tertiary partial product having the same combinational significance, and dividing said difference by two, each of said plurality of subtractive factors being representable by an expression $F_{m,n}{}^-$, where $$F_{m,n}{}^- = (P2_{m,n} - P3_{m,n}) \div 2;$$

(10) accumulating said plurality of primary partial products, said plurality of subtractive factors and said plurality of additive factors in a plurality of register cells of a storage means for storing information to yield an interim sum in each of said plurality of register cells, said plurality of register cells being arrayed hierarchically from a first register cell to a (4j−1) register cell, where j=the number of first segment-pairs in said plurality of first segment-pairs, said first register cell being of lowest significance in said hierarchical arrangement, each of said plurality of register cells being representable by $r_x$, where x indicates the significance of a respective register cell, said accumulation of said plurality of primary partial products in a respective register cell being effected according to the relationship:

$$P1_{m,n}—[\text{accumulates in}]\rightarrow r_{2(m+n)-3};$$

said accumulation of said plurality of subtractive factors in a respective register cell being effected according to the relationship:

$$F_{m,n}{}^- —[\text{accumulates in}]\rightarrow r_{2(m+n)}2;$$

said accumulation of said plurality of additive factors in a respective register cell being effected according to the relationship:

$$F_{m,n}{}^+ —[\text{accumulates in}]\rightarrow r_{2(m+n)-1};$$

(11) effecting a shifting accumulation operation from a lesser-significant register cell to a next-higher-significance cell within said storage means, beginning with the least-significant register cell, said shifting accumulation operation comprising shifting specific digits in said interim sum of said lesser-significance register cell, said specific digits being all digits having higher significance than the number of least-significance digits in said interim sum of said lesser-significance register cell equal to the number of digits in each of said first segments of said at least one first segment-pair from said lesser-significance register cell to said next-higher-significance register cell, and summing said shifted digits of higher significance as least-significant digits with said interim sum in said next-higher-significance register cell; and

(12) repeating step (11) until said next-higher-significance register cell is said (4j−1) cell; and

(13) shifting the contents of said plurality of register cells from said plurality of register cells.

8. An apparatus for determining the product of a first number and a second number, said first number having a plurality of first digits hierarchically arranged from a least-significant first digit to a most-significant first digit, said second number having a plurality of second digits hierarchically arranged from a least-significant second digit to a most-significant second digit; said first number being segmented into a plurality of first segments, each of said plurality of first segments including at least one of said plurality of first digits and spanning a first hierarchical range, said plurality of first segments being arrayed in at least one first segment-pair of hierarchically adjacent ones of said plurality of first segments, each of said at least one first segment-pair having a first pair-significance; said second number being segmented into a plurality of second segments, each of said plurality of second segments including at least one of said plurality of second digits and spanning a second hierarchical range, there being for each of said plurality of first segments spanning a respective first hierarchical range a corresponding one of said second segments spanning a second hierarchical range equal to said respective first hierarchical range; said plurality of second segments being arrayed in at least one second segment-pair of hierarchically-adjacent ones of said plurality of second segments, there being for each of said at least one first segment-pair having a respective first pair-significance a corresponding one of said at least one second segment-pair having a second pair-significance equal to said respective first pair-significance; the apparatus comprising:

a plurality of logic means for mathematically processing at least one input to generate at least one output, said at least one output being mathematically related to selected of said at least one input according to a predetermined algorithm;

an accumulator means for receiving values and accumulating said values to generate accumulated values; and a register means for storing information, said register means including a plurality of register cells, said plurality of register cells being arranged hierarchically by significance, each of said plurality of register cells being representable by "$r_x$", "x" indicates the significance of a respective register cell, said register means being responsive to a shifting signal to selectively internally shift said information;

a first array of said plurality of logic means receiving said at least one first segment-pair and generating a first additive compression for each of said at least one first segment-pair, each said first additive compression being representable by an expression "$(a_m+b_m)$";

a second array of said plurality of logic means receiving said at least one second segment-pair and generating a second additive compression for each of said at least one second segment-pair, each said second additive compression being representable by an expression "$(c_n+d_n)$";

a third array of said plurality of logic means receiving a first lesser-significant segment of each of said at least one first segment-pair and a second lesser-significant segment of each of said at least one second segment-pair and generating a set of primary partial products, said set of primary partial products comprising the products of each said first lesser-significant segment with each of said second lesser-significant segment, each of said set of primary partial products being representable by an expression "$P1_{m,n}$", where $P1_{m,n}=b_m d_n$, and m,n establishes a combinational significance for each said primary partial product;

a fourth array of said plurality of logic means receiving each said first additive compression and each said second additive compression and generating a set of secondary partial products comprising the products of each said first additive compression with each said second additive compression, each of said set of secondary partial products being representable by an expression "$P2_{m,n}$", where $$P2_{m,n}=(a_m+b_m)(c_n+d_n)$$

and m,n establishes a combinational significance for each said set of secondary partial products;

a fifth array of said plurality of logic means receiving each said first subtractive compression and each said second subtractive compression and generating a set of tertiary partial products comprising the products of each of said first subtractive compressions with each of said second subtractive compressions, each of said set of tertiary partial products being representable by an expression "$P3_{m,n}$", where $P3_{m,n}=(a_m-b_m)(c_n-d_n)$, and m,n establishes a combinational significance for each of said set of tertiary partial products;

a sixth array of said plurality of logic means receiving said set of primary partial products, said set of secondary partial products, and said tertiary partial products and generating a set of additive factors comprising the sum of each secondary partial product having a specific combinational significance and a corresponding tertiary partial product having the said specific combinational significance, dividing said sum by two, and subtracting a corresponding primary partial product having the same specific combinational significance, each of said set of additive factors being representable by an expression "$F_{m,n}{}^+$", where $$F_{m,n}{}^+=[(P2_{m,n}+P3_{m,n})\div 2]-P1_{m,n};$$

a seventh array of said plurality of logic means receiving said set of secondary partial products and said set of tertiary partial products, and generating a set of subtractive factors comprising the difference between each secondary partial product having a specific combinational significance less a corresponding tertiary partial product having the same specific combinational significance, and dividing said difference by two, each of said set of subtractive factors being representable by an expression "$F_{m,n}{}^-$", where $$F_{m,n}{}^-=(P2_{m,n}-P3_{m,n})\div 2];$$

said accumulator means receiving said set of primary partial products, said set of additive factors, and said set of subtractive factors for said accumulating, said accumulator means generating said accumulated values for storage in said plurality of register cells; accumulated primary partial products being stored according to the relationship:

$$P1_{m,n}-[\text{stored in}]\to r_{2(m+n)-3};$$

accumulated subtractive factors being stored according to the relationship:

$$F_{m,n}{}^- - [\text{stored in}]\to r_{2(m+n)-2};$$

accumulated additive factors being stored according to the relationship:

$$F_{m,n}{}^+ - [\text{stored in}]\to r_{2(m+n)-1};$$

where $m=1, 2, 3, \ldots$ and $n=1, 2, 3, \ldots$;

said register means responding to said shifting signal to effect a shifting accumulation operation from a lesser respective register cell to a next-higher-significance register cell, beginning with the least-significant respective register cell, said accumulation shifting operation comprising shifting specific digits of an accumulated value in said lesser-significant respective register cell, said specific digits being all digits having higher significance than the number of least-significant digits in said accumulated value equal to the number of digits in each of said first segments of said at least one segment-pair, from said lesser-significant register cell to said next-higher-significance register cell, and summing said shifted digits as least-significant digits with said accumulated value in said next-higher-significance register cell.

9. An apparatus for determining the product of a first number and a second number, the apparatus comprising:

a logic means for mathematically manipulating segments of said first number and said second number and generating a plurality of output factors;

an accumulator means for accumulating said output factor for providing accumulated values; and a register means for storing said accumulated values; said first number being segmented into at least one first segment-pair, each respective first segment-pair of said at least one first segment-pair comprising a lower-significance first segment including a first number of digits, and an adjacent higher-significance first segment including a second number of digits; said at least one first segment-pair spanning a significance range;

said second number being segmented into at least one second segment-pair, each respective second segment-pair comprising a lower-significance second segment including said first number of digits, and an adjacent higher-significance second segment including said second number of digits, said at least one second segment-pair spanning said significance range;

each said respective first segment-pair being representable by an expression "$a_m,b_m$", and each said respective second segment-pair being representable by an expression "$c_n,d_n$"; where "a" represents said higher-significance first segment, "b" represents said lower-significance first segment, and "m"=1, 2, 3, . . . , and indicates the significance of said respective first segment-pair within said first number; and where "c" represents said higher-significance second segment, "d" represents said lower-significance second segment, and "n"=1, 2, 3, . . . , and indicates the significance of said respective second segment-pair within said second number;

said logic means being configured to calculate, for each combinational significance m,n, said plurality of output factors;

said plurality of output factors comprising a partial product, "$P_{m,n}$", where $P_{m,n}$ $b_m d_n$; an additive factor, "$F_{m,n}{}^+$", where:

$$F_{m,n}{}^+ = \{[(a_m+b_m)(c_n+d_n)+(a_m-d_n)] \div 2\} P_{m,n};$$

and a subtractive factor, "$F_{m,n}{}^-$", where:

$$F_{m,n}{}^- = [(a_m+b_m)(c_n d_n)-(a_m-b_m)(c_n-d_n) \div 2;$$

said accumulator means accumulating said output factors for storage as said accumulated values in a register cell, $r_x$, within said register means, where "x" indicates the significance of a respective register cell, "r", according to the following relationships:

| | | |
|---|---|---|
| $P_{m,n}$ | —[accumulates for]→ | $r_{2(m+n)-3}$; |
| $F^-{}_{m,n}$ | —[accumulates for]→ | $r_{2(m+n)-2}$; and |
| $F^+{}_{m,n}$ | —[accumulates for]→ | $r_{2(m+n)-1}$; | said accumulated values being received in appropriate register cells $r_x$ of said register means; said register means effecting a shifting accumulation operation with said accumulated values, said shifting accumulation operation comprising shifting specific digits of said accumulated value stored in a lesser-significance register cell to a higher-significance register cell, and adding said specific digits to said accumulated value stored in said higher-significance register cell as least-significant digits; said specific digits being those digits of said accumulated value in said lesser-significance cell having higher significance than the number of least-significant digits equal to said first number of digits; said shifting accumulation operation being effected sequentially between significance-adjacent register cells within said register means from said least-significant register cell to said most-significant register cell.

10. An apparatus for determining the product of a first number and a second number, said first number having a plurality of digits hierarchically arranged from a first least-significant place to a first most-significant place, said second number having a plurality of second digits hierarchically arranged from a second least-significant place to a second most-significant place, the apparatus comprising:

a logic means for determining a plurality of partial products, said logic means treating blank places of the shorter number of said first number and said second number as zeroes while effecting said determining of said plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

a register means for storing information, said register means comprising a plurality of register cell means for storing accumulated values, said register cell means having a hierarchical significance; and an accumulating means for accumulating selected partial products of said plurality of partial products to produce accumulated values in specified register cell means of said plurality of register cell means according to the following relationships:

$$P_{m,n}—[\text{accumulates in}] \rightarrow r_x; \ x=(m+n)-1$$

where "$P_{m,n}$" represents said selected partial product; "m" represents said first significance, m=1, 2, . . . ; "n" represents said second significance, n=1, 2, . . . ; "$r_x$" represents said specified register cell means having significance "x";

said register means effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means;

the contents of said plurality of register cell means after completion of said shifting accumulation operation comprising said product.

11. An apparatus for determining the product of a first number and a second number, said first number having a plurality of digits hierarchically arranged from a first least-significant place to a first most-significant place, said second number having a plurality of second digits hierarchically arranged from a second least-significant place to a second most-significant place, the apparatus comprising:

a logic means for determining a plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product; and a register means for storing information, said register means comprising a plurality of register cell means for storing accumulated values, said register cell means having a hierarchical significance;

said register means accumulating selected partial products of said plurality of partial products to produce accumulated values in specified register cell means of said plurality of register cell means according to the following relationships:

$$P_{m,n} \text{—[accumulates in]} \rightarrow r_x; \ x=(m+n)-1$$

where "$P_{m,n}$" represents said selected partial product; "m" represents said first significance, $m=1, 2, \ldots$; "n" represents said second significance, $n=1, 2, \ldots$; "$r_x$" represents said specified register cell means having significance "x";

said register means effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means to determine said product.

12. An apparatus for determining the product of a first number and a second number, said first number having a plurality of digits hierarchically arranged from a first least-significant place to a first most-significant place, said second number having a plurality of second digits hierarchically arranged from a second least-significant place to a second most-significant place, the apparatus comprising:

a logic means for determining a plurality of partial products, said logic means considering blank places of the shorter number of said first number and said second number as having a value of zero during said determining of said plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

a storage array means for storing said plurality of partial products, said storage array means being operatively addressable as a matrix, said matrix having a plurality of columns and a plurality of rows, said plurality of partial products being stored within said matrix according to said combinational significance, said first significance determining a first order of storing of said plurality of partial products in one of said plurality of columns and said plurality of rows, said second significance determining a second order of storing said plurality of partial products in the other of said plurality of columns and said plurality of rows; and a register means for storing information, said register means comprising a plurality of register cell means for storing accumulated values, said register means being operatively connected with said storage array means, said register cell means having a hierarchical significance;

said register means accumulating selected partial products of said plurality of partial products in specified register cell means of said plurality of register cell means according to the following relationships:

$$P_{m,n} \text{—[accumulated in]} \rightarrow r_x; \ x=(m+n)-1;$$

where "$P_{m,n}$" represents said selected partial product; "m" represents said first order of storing, $m=1, 2, \ldots$; "n" represents said second order of storing, $n=1, 2, \ldots$; "$r_x$" represents said specified register cell means having significance "x";

said register means effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means within said register means from the least-significant register cell means to the most-significant register cell means within said register means.

13. An apparatus for determining the product of a first number and a second number, said first number having a plurality of digits hierarchically arranged from a first least-significant place to a first most-significant place, said second number having a plurality of second digits hierarchically arranged from a second least-significant place to a second most-significant place, the apparatus comprising:

means for determining a plurality of partial products, treating blank places of the shorter number of said first number and said second number as zeroes while determining said plurality of partial products, said plurality of partial products comprising a respective partial product for each pair-combination of said plurality of first digits and said plurality of second digits, each of said respective partial products having a combinational significance, said combinational significance being established by said first significance and said second significance of said pair-combination involved in said respective partial product;

a register for storing information, said register comprising a plurality of register cell for storing accumulated values, each of said plurality of register cells having a hierarchical significance;

means for accumulating selected partial products of said plurality of partial products to produce accumulated values in specified register cells of said plurality of register cells according to the following relationships:

$$P_{m,n} - [\text{accumulates in}] \rightarrow r_x \cdot x = (m+n) - 1$$

where "$P_{m,n}$" represents said selected partial product; "m" represents said first significance, m = 1, 2, . . . ; "n" represents said second significance, n = 1, 2, . . . ; "$r_x$" represents said specified register cell means having significance "x";

means for effecting a shifting accumulation operation comprising shifting specific digits of said accumulated value stored in a lesser-significant register cell of said plurality of register cells to the next-higher-significant register cell of said plurality of register cells containing an accumulated value, and adding said specific digits to said accumulated value stored in said next-higher-significant register cell as least-significant digits; said specific digits being those digits of said accumulated value stored in said lesser-significant register cell having higher significance than the least-significant digit of said accumulated value; said shifting accumulation operation being effected sequentially between significance-adjacent register cells of said plurality of register cells from the least-significant register cell to the most-significant register cell within said register; and means for shifting the contents of said plurality of register cells from said plurality of register cells.

* * * * *